(12) United States Patent
Asanoma

(10) Patent No.: US 11,549,601 B2
(45) Date of Patent: Jan. 10, 2023

(54) MIXER FAUCET

(71) Applicant: Takagi Co., Ltd., Kitakyushu (JP)

(72) Inventor: Susumu Asanoma, Kitakyushu (JP)

(73) Assignee: TAKAGI CO., LTD., Kitakyushu (JP)

( * ) Notice: Subject to any disclaimer, the term of this patent is extended or adjusted under 35 U.S.C. 154(b) by 75 days.

(21) Appl. No.: 17/262,653

(22) PCT Filed: Aug. 30, 2018

(86) PCT No.: PCT/JP2018/032219
§ 371 (c)(1),
(2) Date: Jan. 22, 2021

(87) PCT Pub. No.: WO2020/044514
PCT Pub. Date: Mar. 5, 2020

(65) Prior Publication Data
US 2021/0301933 A1    Sep. 30, 2021

(51) Int. Cl.
*F16K 11/078* (2006.01)
*E03C 1/04* (2006.01)
*F16N 1/00* (2006.01)

(52) U.S. Cl.
CPC ............ *F16K 11/0787* (2013.01); *E03C 1/04* (2013.01); *F16N 1/00* (2013.01); *F16N 2210/00* (2013.01); *Y10T 137/9464* (2015.04)

(58) Field of Classification Search
CPC ...... F16N 1/00; F16N 2210/00; E03C 1/0404; E03C 1/04; F16K 11/0787; Y10T 137/9464

USPC ......................................................... 137/801
See application file for complete search history.

(56) References Cited

U.S. PATENT DOCUMENTS

| 4,657,045 A | 4/1987 | Kitamura |
| 2004/0084097 A1* | 5/2004 | Bloom ................ F16K 11/0787 137/625.17 |

FOREIGN PATENT DOCUMENTS

| JP | 2002022040 A | 1/2002 |
| JP | 2005282658 A | 10/2005 |

* cited by examiner

*Primary Examiner* — Daphne M Barry
(74) *Attorney, Agent, or Firm* — Alleman Hall Creasman & Tuttle LLP

(57) ABSTRACT

Provided is a mixer faucet configured such that a lubricant can be effectively supplied. The mixer faucet includes a fixed valve body and a movable valve body. The fixed valve body includes a hot water supply hole, a cold water supply hole, a drain hole, a first sliding surface, and a lubricant retention portion. At least a part of the lubricant retention portion is provided in a circumferentially extended region of the hot water supply hole and a circumferentially extended region of the cold water supply hole. In the circumferentially extended region, only the first sliding surface is present between the hot water supply hole and the lubricant retention portion. In the circumferentially extended region, only the first sliding surface is present between the cold water supply hole and the lubricant retention portion.

20 Claims, 14 Drawing Sheets

MIXER FAUCET

TECHNICAL FIELD

The present disclosure relates to a mixer faucet.

BACKGROUND ART

A single lever mixer faucet including a fixed valve body and a movable valve body that slides on the fixed valve body has been known. In such a mixer faucet, a lubricant such as grease is used in order to reduce the sliding resistance between the fixed valve body and the movable valve body. JP 2002-22040A discloses a fixed valve body including a recessed portion filled with a lubricant.

CITATION LIST

Patent Literature

Patent Literature 1: JP 2002-22040A

SUMMARY OF THE INVENTION

Problems to be Solved by the Invention

A lubricant that has been supplied to a sliding interface flows out when water flows onto the sliding interface. When the lubricant has flowed out from the sliding interface, abrasion is accelerated, and this may cause water to leak from the sliding interface and also may cause the valve bodies to stick together. The inventor of the present invention has found through in-depth studies that the degree of lubricant outflow varies depending on regions on the sliding interface. In addition, it is preferable to supply a lubricant over a longer period of time. In light of the foregoing, the present disclosure relates to a mixer faucet configured such that a lubricant can be more effectively supplied.

Solution to Problems

In one aspect, the present disclosure provides a mixer faucet including a fixed valve body and a movable valve body. The fixed valve body includes a hot water supply hole, a cold water supply hole, a drain hole, a first sliding surface on which the movable valve body slides, and a lubricant retention portion adjacent to the first sliding surface. The movable valve body includes a second sliding surface that is configured to slide on the first sliding surface and a hot-and-cold water mixer recess. At least a part of the lubricant retention portion is provided in the following (a) and (b): (a) a circumferentially extended region of the hot water supply hole; and (b) a circumferentially extended region of the cold water supply hole. In the circumferentially extended region of the hot water supply hole, only the first sliding surface is present between the hot water supply hole and the lubricant retention portion, and in the circumferentially extended region of the cold water supply hole, only the first sliding surface is present between the cold water supply hole and the lubricant retention portion.

In another aspect, the present disclosure provides another mixer faucet including a fixed valve body and a movable valve body. The fixed valve body includes a hot water supply hole, a cold water supply hole, a drain hole, a first sliding surface on which the movable valve body slides, and a lubricant retention portion adjacent to the first sliding surface. The movable valve body includes a second sliding surface that is configured to slide on the first sliding surface and a hot-and-cold water mixer recess. The lubricant retention portion includes a narrow portion whose width is locally reduced. The narrow portion extends downward from the first sliding surface.

Advantageous Effects of Invention

In one aspect, the present disclosure allows a lubricant to be effectively supplied to regions where outflow of the lubricant is likely to occur. In another aspect, the present disclosure allows a lubricant to be supplied over a long period of time.

DESCRIPTION OF EMBODIMENTS

Embodiments of the present disclosure will be described in detail below with reference to the drawings as necessary. In the following, the terms "cold water" and "hot water" are used. For the purpose of distinguishing liquid from a hot water supply hole and liquid from a cold water supply hole, the terms "hot water" and "cold water" are used selectively, when necessary. On the other hand, in some descriptions, the term "water" is used to collectively refer to liquid from a hot water supply hole and from a cold water supply hole.

Figure 1:
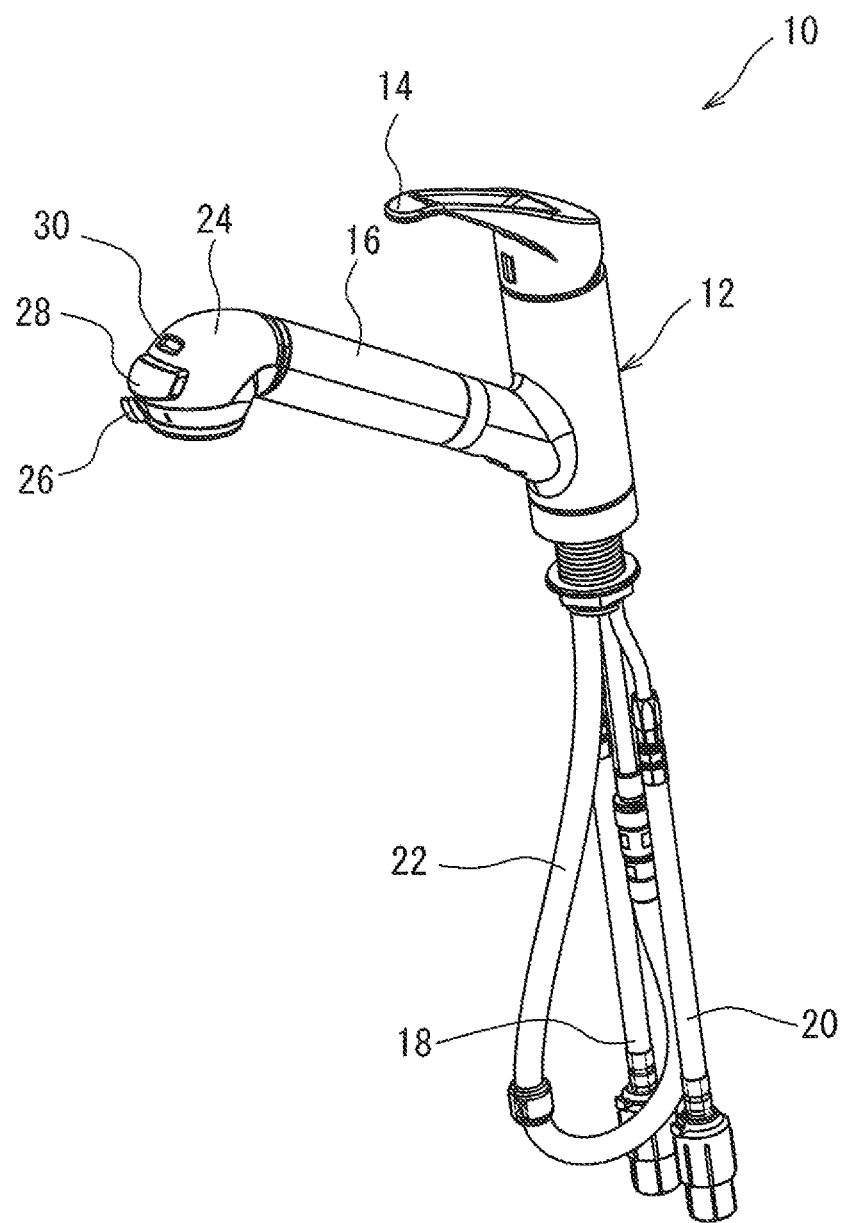
FIG. 1 is a perspective view of a mixer faucet according to a first embodiment.

FIG. 1 is a perspective view of a mixer faucet 10 according to one embodiment. The mixer faucet 10 includes a faucet main body 12, a lever handle 14, a discharge portion 16, a hot water inlet pipe 18, a cold water inlet pipe 20, and a discharge pipe 22. The discharge portion 16 includes a head 24. The head 24 includes a switching lever 26. Switching between shower discharge and normal discharge can be achieved by operating the switching lever 26. The mixer faucet 10 is applicable to use in, for example, a kitchen or a washbasin.

The head 24 also includes a switching button 28 and a display portion 30. A water purification cartridge (not shown) is accommodated in the discharge portion 16. The switching button 28 is used to perform switching between a flow path that passes through the water purification cartridge and a flow path that does not pass through the water purification cartridge. When the flow path that passes through the water purification cartridge is selected as a result of the switching, purified water is discharged. When the flow path that does not pass through the water purification cartridge is selected as a result of the switching, raw water is discharged. The display portion 30 indicates whether discharge water is purified water or raw water.

By turning the lever handle 14 forward and rearward (by moving the lever handle 14 up and down), the lever position in the front-rear direction (hereinafter also referred to as "front-rear lever position") is changed. The amount of discharge water is adjusted by adjusting the front-rear lever position. In the present embodiment, the amount of discharge water increases as the lever handle 14 is moved upward, and water is shut off when the lever handle 14 is moved to the lowest position. A water shut-off state is achieved when the lever handle 14 is at the lowest position regardless of a left-right lever position (to be described below). On the contrary, the mixer faucet 10 may be configured such that the amount of discharge water increases as the lever handle 14 is moved downward. By turning the lever handle 14 leftward and rightward, the lever position in the left-right direction (hereinafter referred to as "left-right lever position") is changed. Depending on the left-right lever position, the mixing ratio of hot water and cold water changes. The temperature of discharge water can be adjusted by turning the lever handle 14 leftward and rightward.

Figure 2:
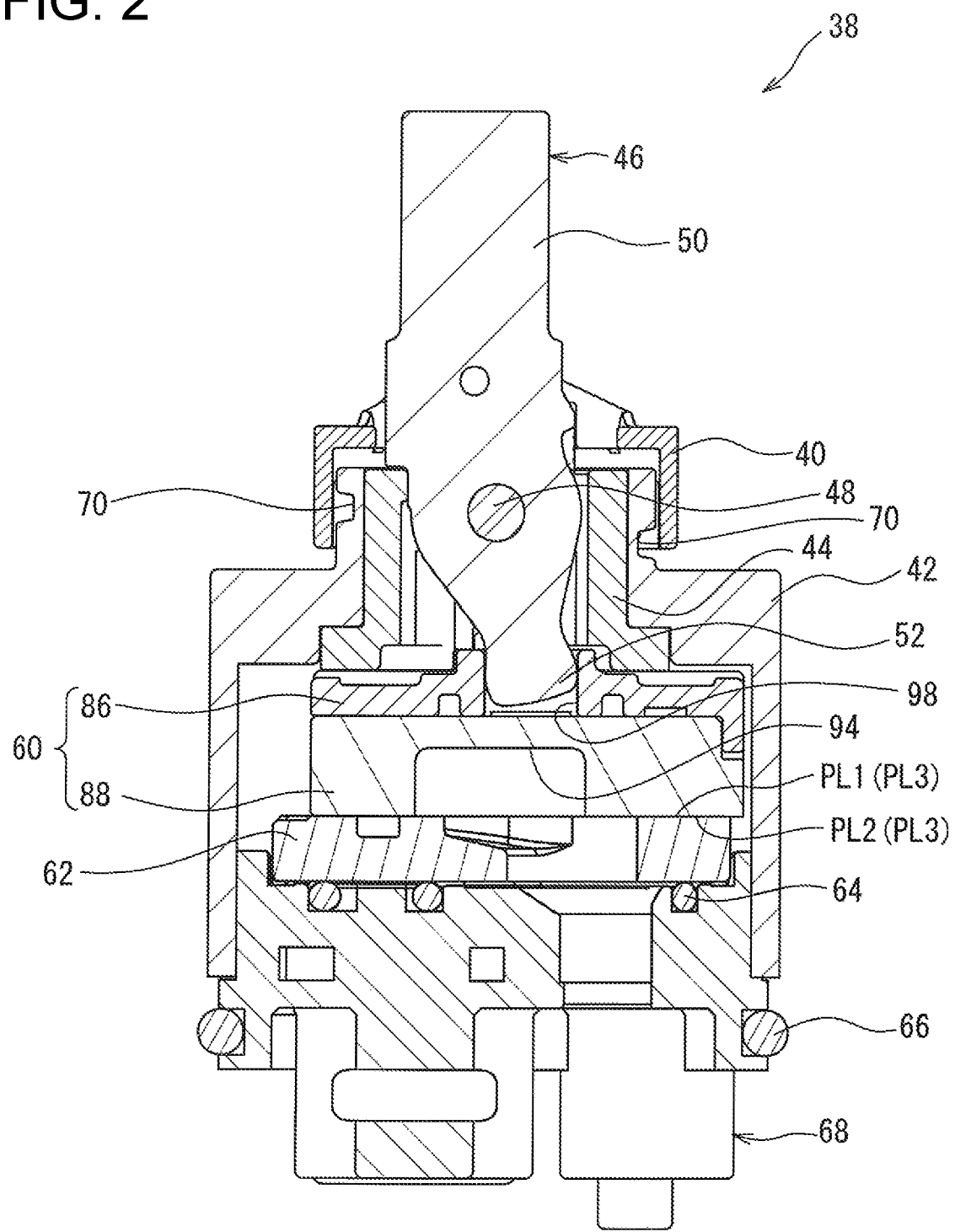
FIG. 2 is a cross-sectional view of a valve assembly used in the mixer faucet shown in FIG. 1.

FIG. 2 is a vertical cross-sectional view of a valve assembly 38. In the mixer faucet 10, the valve assembly 38 is replaceable.

The valve assembly 38 is accommodated in the faucet main body 12 of the mixer faucet 10. As shown in FIG. 2, the valve assembly 38 includes a movable body 40, an upper case 42, a rotatable body 44, a lever 46, a lever rotary shaft 48, a movable valve body 60, a fixed valve body 62, an inner sealing member 64, a lower sealing member 66, and a lower case 68.

The movable body 40 is held by the rotatable body 44 in such a manner that the movable body 40 can be moved up and down. The movable body 40 can be moved only up and down with respect to the rotatable body 44, and cannot relatively rotate with respect to the rotatable body 44. The movable body 40 is configured such that it rotates together with the rotatable body 44 in conjunction with leftward and rightward turning of the lever handle 14 and can also move up and down in conjunction with this rotation. The up-and-down movement of the movable body 40 is achieved by a cam mechanism formed between the movable body 40 and the upper case 42. A cam groove 70 is provided on the outer peripheral surface of the upper case 42, and a protrusion (not shown) to be engaged with the cam groove 70 is provided on the inner peripheral surface of the movable body 40. The cam mechanism is effected when this protrusion moves in the cam groove 70.

The movable body 40 includes a front-rear click mechanism that is effected when the lever handle 14 is turned forward and rearward. The front-rear click mechanism is configured such that the engagement of the front-rear click mechanism is released when the movable body 40 has moved to the upper side. The front-rear click mechanism is configured such that the engagement of the front-rear click mechanism is established when the movable body 40 has moved to the lower side. With this configuration, the front-rear click mechanism is effected when the lever handle 14 is at a predetermined left-right lever position.

The upper case 42 is fixed to the lower case 68. The upper case 42 and the lower case 68 together constitute an accommodating portion in which the valve bodies 60 and 62 are accommodated.

The rotatable body 44 is held by the upper case 42 in such a manner that the rotatable body 44 is rotatable within a predetermined angular range. The rotatable body 44 rotates together with the lever handle 14. The rotatable body 44 holds the lever 46 in such a manner that the lever 46 can be turned. The rotatable body 44 holds an upper member 86 in such a manner that the upper member 86 is slidable.

The lever 46 includes an upper portion 50 and a lower portion 52. The lever handle 14 is fixed to the upper portion 50. When the lever handle 14 is turned forward and rearward, the lever 46 turns around the lever rotary shaft 48. That is, forward and rearward turning of the lever handle 14 also causes forward and rearward turning of the lever 46. Leftward and rightward turning of the lever handle 14 also causes leftward and rightward turning of the lever 46.

The movable valve body 60 includes the upper member 86 and a lower member 88. The upper member 86 is fixed to the lower member 88. A hot-and-cold water mixer recess 94 and a second sliding surface PL2 are provided on the lower surface of the lower member 88 (the movable valve body 60). The upper member 86 includes a lever engagement recess 98. The lower portion 52 of the lever 46 is engaged with the lever engagement recess 98.

The lower portion 52 moves when the lever 46 is turned forward and rearward, and the upper member 86 slides with respect to the rotatable body 44 in conjunction with this movement. As a result, the movable valve body 60 moves with respect to the fixed valve body 62.

When the lever 46 is turned leftward and rightward, the rotatable body 44 rotates together with the lever 46, whereby the upper member 86 (the movable valve body 60) also rotates. As a result, the movable valve body 60 rotates with respect to the fixed valve body 62.

The lower case 68 has a hot water inlet hole, a cold water inlet hole, and a discharge hole, which are connected to the hot water inlet pipe 18, the cold water inlet pipe 20, and the discharge pipe 22, respectively. The inner sealing member 64 seals a gap between the fixed valve body 62 and the lower case 68 to provide sealing for the connection portions between these three pairs of the holes and pipes.

The fixed valve body 62 is located on the upper side of the lower case 68. The fixed valve body 62 is pressed against the movable valve body 60 by the inner sealing member 64 while being supported by the inner sealing member 64 from below. The upper surface of the fixed valve body 62 includes a first sliding surface PL1. The first sliding surface PL1 is a surface on which a second sliding surface PL2 of the movable valve body 60 slides. A sliding interface PL3 is formed by the first sliding surface PL1 and the second sliding surface PL2. The first sliding surface PL1 means the entire flat surface that is flush with a portion being in contact with the second sliding surface PL2.

Figure 3:
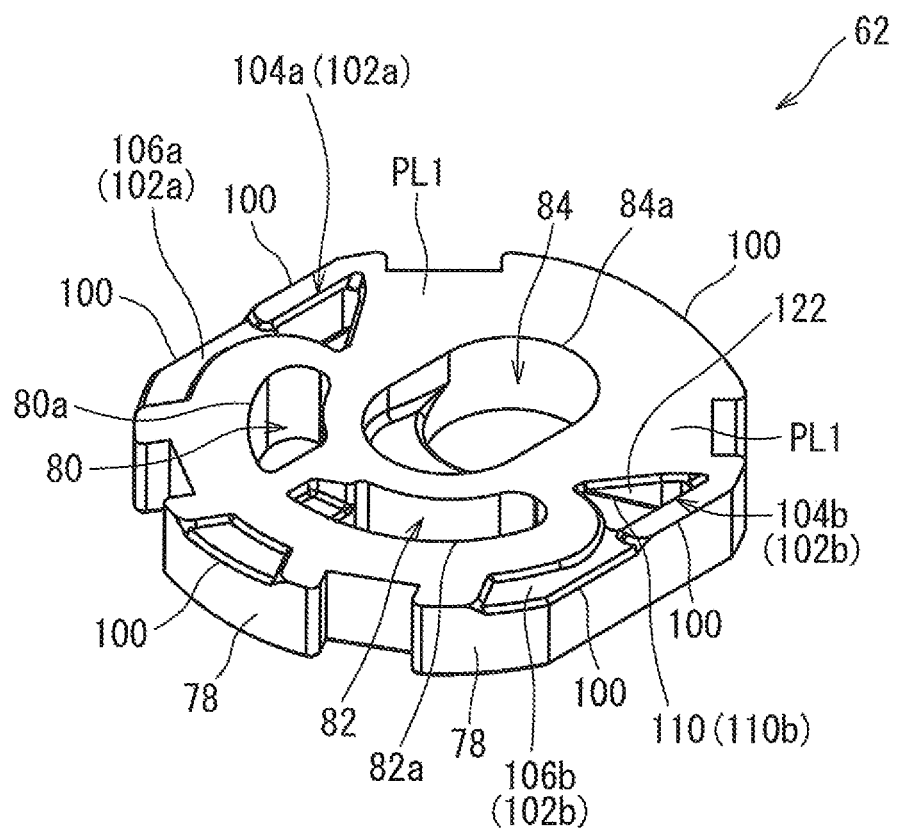
FIG. 3 is a perspective view of a fixed valve body according to the first embodiment.
Figure 4:
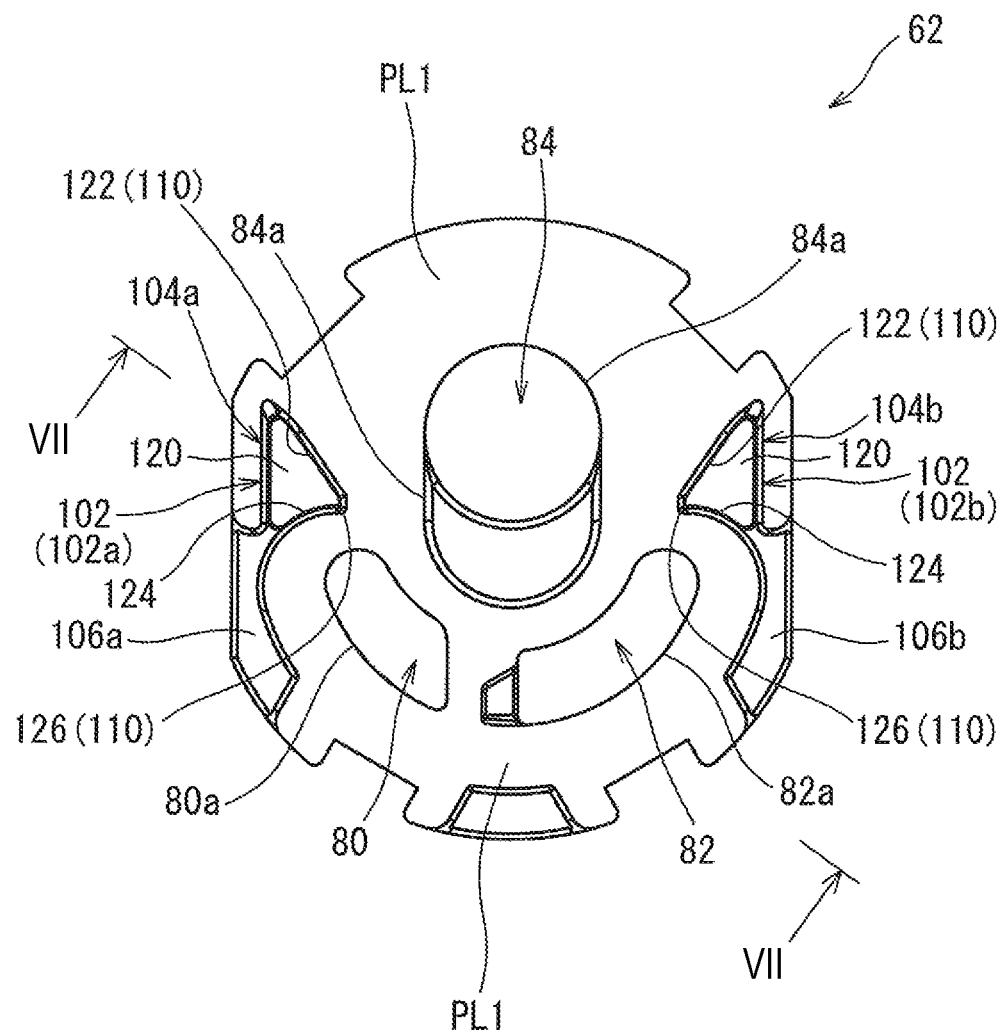
FIG. 4 is a plan view of the fixed valve body according to the first embodiment.
Figure 5:
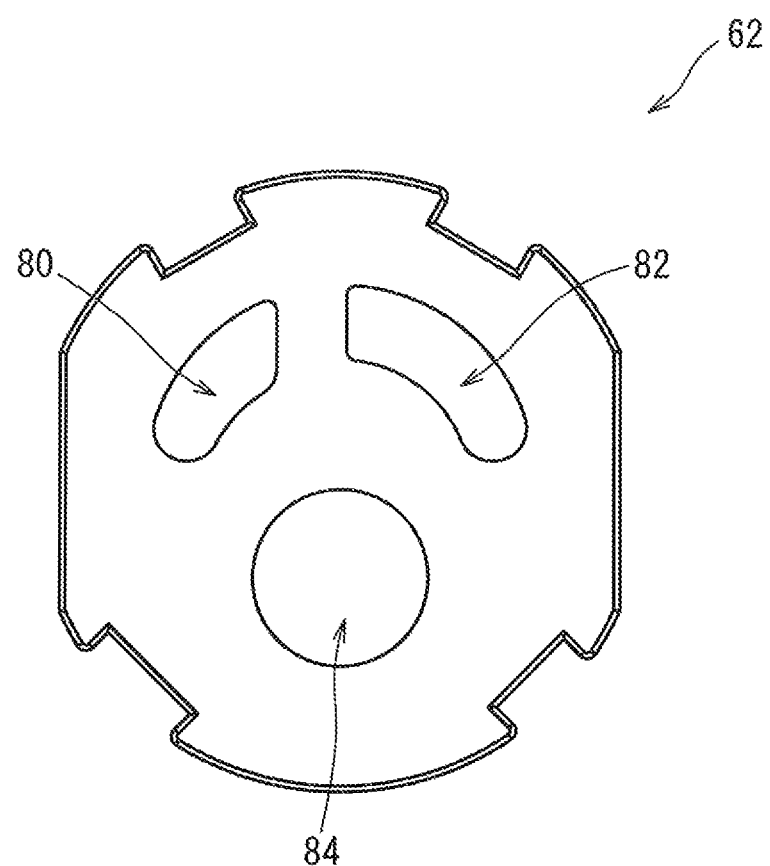
FIG. 5 is a bottom view of the fixed valve body according to the first embodiment.

FIG. 3 is a perspective view of the fixed valve body 62. FIG. 4 is a plan view of the fixed valve body 62. FIG. 5 is a bottom view of the fixed valve body 62.

The fixed valve body 62 includes a hot water supply hole 80, a cold water supply hole 82, and a drain hole 84. The hot water supply hole 80 penetrates through the fixed valve body 62. The hot water supply hole 80 is connected to the hot water inlet hole of the lower case 68. The cold water supply hole 82 penetrates through the fixed valve body 62. The cold water supply hole 82 is connected to the cold water inlet hole of the lowercase 68. The drain hole 84 penetrates through the fixed valve body 62. The drain hole 84 is connected to the discharge hole of the lower case 68.

The hot water supply hole 80 has an upper opening line 80*a*. The upper opening line 80*a* is the outline of the hot water supply hole 80 on the first sliding surface PL1. The upper opening line 80*a* is the outline of an upper opening of the hot water supply hole 80.

The cold water supply hole 82 has an upper opening line 82*a*. The upper opening line 82*a* is the outline of the cold water supply hole 82 on the first sliding surface PL1. The upper opening line 82*a* is the outline of an upper opening of the cold water supply hole 82.

The drain hole 84 has an upper opening line 84*a*. The upper opening line 84*a* is the outline of the drain hole 84 on the first sliding surface PL1. The upper opening line 84*a* is the outline of an upper opening of the drain hole 84.

In the fixed valve body 62, the supply holes 80 and 82 are disposed asymmetrically. When the left-right lever position is at the front position, only cold water is discharged. That is, a cold water discharge state is achieved when the left-right lever position is at the front position. This configuration contributes to saving of hot water, whereby the energy-saving performance is improved. Alternatively, the supply holes 80 and 82 may be disposed symmetrically.

As described above, the first sliding surface PL1 is provided on the upper surface of the fixed valve body 62. The first sliding surface PL1 is a flat surface. The first sliding surface PL1 is formed in a portion where the holes 80, 82, and 84 and lubricant retention portions (to be described below) are not present.

As described above, by operating the lever handle 14, the movable valve body 60 is moved with respect to the fixed valve body 62. As a result, the hot-and-cold water mixer recess 94 of the movable valve body 60 also moves. The water discharge state changes depending on the position of the hot-and-cold water mixer recess 94. When the hot-and-cold water mixer recess 94 overlaps the hot water supply hole 80 and/or the cold water supply hole 82 and also overlaps the drain hole 84, a water discharge state is achieved. The water discharge state includes a mixture discharge state, a hot water discharge state, and the cold water discharge state. When the hot-and-cold water mixer recess 94 overlaps the hot water supply hole 80 and the cold water supply hole 82, the mixture discharge state is achieved. In the mixture discharge state, hot water from the hot water supply hole 80 and cold water from the cold water supply hole 82 are discharged in a state of being mixed together. When the hot-and-cold water mixer recess 94 overlaps the hot water supply hole 80 only and does not overlap the cold water supply hole 82, the hot water discharge state is achieved. In the hot water discharge state, only hot water from the hot water supply hole 80 is discharged, and cold water from the cold water supply hole 82 is not discharged. When the hot-and-cold water mixer recess 94 overlaps the cold water supply hole 82 only and does not overlap the hot water supply hole 80, the cold water discharge state is achieved. In the cold water discharge state, only cold water from the cold water supply hole 82 is discharged, and hot water from the hot water supply hole 80 is not discharged. When the hot-and-cold water mixer recess 94 does not overlap either the hot water supply hole 80 or the cold water supply hole 82, the water shut-off state is achieved.

The fixed valve body 62 has an outer edge 100. The upper opening line 80*a* of the hot water supply hole 80 does not extend to the outer edge 100. That is, the hot water supply hole 80 is not connected to the outside of the fixed valve body 62. The entire periphery of the hot water supply hole 80 is surrounded by the first sliding surface PL1. The upper opening line 82*a* of the cold water supply hole 82 is not connected to the outer edge 100. That is, the cold water supply hole 82 is not connected to the outside of the fixed valve body 62. The entire periphery of the cold water supply hole 82 is surrounded by the first sliding surface PL1. The upper opening line 84*a* of the drain hole 84 is not connected to the outer edge 100. That is, the drain hole 84 is not connected to the outside of the fixed valve body 62. The entire periphery of the drain hole 84 is surrounded by the first sliding surface PL1.

The fixed valve body 62 includes lubricant retention portions 102. The lubricant retention portions 102 are provided on the upper surface of the fixed valve body 62. The lubricant retention portions 102 form surfaces that are lower than the first sliding surface PL1. Although not shown in the drawings, the lubricant retention portions 102 contain a lubricant. Examples of the lubricant include grease and wax. In the present embodiment, grease is used as the lubricant. The lubricant retention portions 102 are adjacent to the first sliding surface PL1. The outer edges of the lubricant retention portions 102 are located on the first sliding surface PL1.

The lubricant retention portions 102 include a first lubricant retention portion 102*a* and a second lubricant retention portion 102*b*. The first lubricant retention portion 102*a* and the second lubricant retention portion 102*b* are not connected to each other. The first lubricant retention portion 102*a* and the second lubricant retention portion 102*b* are independent from each other.

The first lubricant retention portion 102*a* is located near the hot water supply hole 80. The shortest distance between the first lubricant retention portion 102*a* and the hot water supply hole 80 is smaller than the shortest distance between the second lubricant retention portion 102*b* and the hot water supply hole 80. The shortest distance between the first lubricant retention portion 102*a* and the hot water supply hole 80 is smaller than the shortest distance between the first lubricant retention portion 102*a* and the drain hole 84. Only the first sliding surface PL1 is present between the first lubricant retention portion 102*a* and the drain hole 84.

The second lubricant retention portion 102*b* is located near the cold water supply hole 82. The shortest distance between the second lubricant retention portion 102*b* and the cold water supply hole 82 is smaller than the shortest distance between the first lubricant retention portion 102*a* and the cold water supply hole 82. The shortest distance between the second lubricant retention portion 102*b* and the cold water supply hole 82 is smaller than the shortest distance between the second lubricant retention portion 102*b* and the drain hole 84. Only the first sliding surface PL1 is present between the second lubricant retention portion 102*b* and the cold water supply hole 82.

The number of lubricant retention portions 102 may be one, or may be two or more. In the present embodiment, the number of lubricant retention portions 102 is two.

In the water discharge state, the hot-and-cold water mixer recess 94 does not overlap the lubricant retention portions 102. In the water shut-off state, the hot-and-cold water mixer recess 94 does not overlap the lubricant retention portions 102. When the lever is at any position in the left-right direction, the hot-and-cold water mixer recess 94 does not overlap the lubricant retention portions 102. When the lever is at any position in the front-rear direction, the hot-and-cold water mixer recess 94 does not overlap the lubricant retention portions 102.

The first lubricant retention portion 102a has a recess 104a. The first lubricant retention portion 102a also has an external connection portion 106a. The external connection portion 106a forms a surface that is lower than the first sliding surface PL1, and is connected to the outer edge 100. The recess 104a is connected to the external connection portion 106a. According to the comparison between the maximum depths of the recess 104a and the external connection portion 106a as measured from the first sliding surface PL1, the recess 104a is deeper than the external connection portion 106a.

The second lubricant retention portion 102b has a recess 104b. The second lubricant retention portion 102b also has an external connection portion 106b. The external connection portion 106b forms a surface that is lower than the first sliding surface PL1, and is connected to the outer edge 100. The recess 104b is connected to the external connection portion 106b. According to the comparison between the maximum depths of the recess 104b and the external connection portion 106b as measured from the first sliding surface PL1, the recess 104b is deeper than the external connection portion 106b.

The first lubricant retention portion 102a and the second lubricant retention portion 102b are symmetrical to each other. In the plan view (FIG. 4), the first lubricant retention portion 102a and the second lubricant retention portion 102b are in a line-symmetric relationship.

Figure 6:
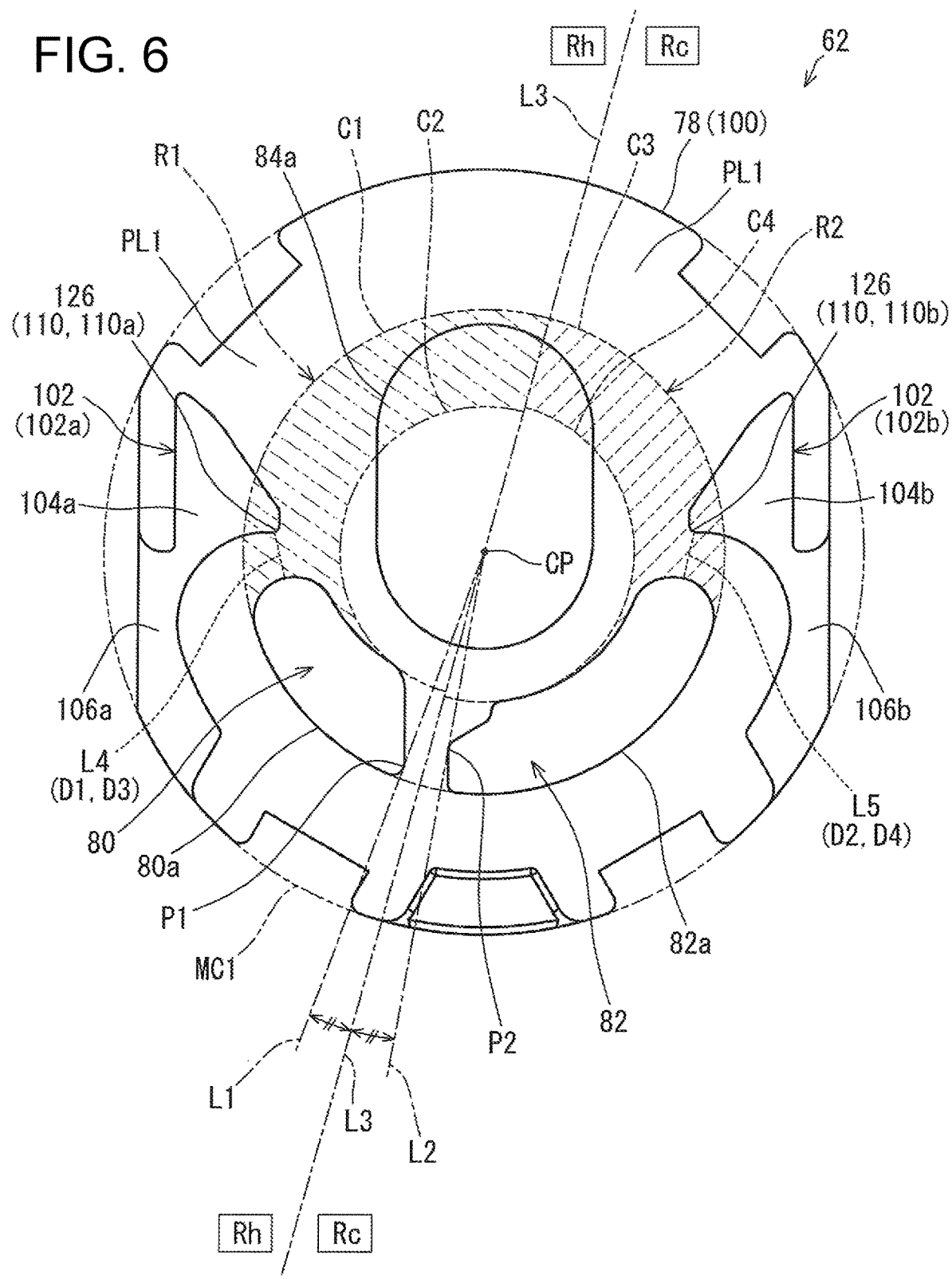
FIG. 6 is an enlarged plan view of the fixed valve body according to the first embodiment.

FIG. 6 is an enlarged plan view of the fixed valve body 62. In FIG. 6, only the upper opening line 82a is shown regarding the cold water supply hole 82, and only the outlines are shown regarding the lubricant retention portions 102.

In FIG. 6, a two-dot chain line indicates a smallest enclosing circle MC1 of the fixed valve body 62. In the present disclosure, the smallest enclosing circle MC1 is defined as follows. The smallest enclosing circle MC1 is defined as, among circles that include the entire fixed valve body 62 inside them, one having the smallest radius. The smallest enclosing circle MC1 is determined with reference to a plan view like the one shown in FIG. 6. The plan view of FIG. 6 shows a projection drawing obtained by the projection of the fixed valve body 62 onto a plane parallel to the first sliding surface PL1. In the present embodiment, the radius R of the smallest enclosing circle MC1 is equal to the radius of a circumferential surface that includes an outer peripheral surface 78 of the fixed valve body 62. In the present disclosure, a radial direction or radially means the radial direction of this smallest enclosing circle MC1. In the present disclosure, a circumferential direction or circumferentially means the circumferential direction of this smallest enclosing circle MC1.

Regarding the fixed valve body 62, the following regions (a) and (b) are defined in the present disclosure. They are regions on the upper surface of the fixed valve body 62. These regions are determined in a plan view of the fixed valve body 62.

(a) a circumferentially extended region R1 of the hot water supply hole 80
(b) a circumferentially extended region R2 of the cold water supply hole 82

In FIG. 6, CP indicates the center of the smallest enclosing circle MC1. A straight line L1 is a straight line that passes through the point CP and a point P1. The point P1 is a point that is on the upper opening line 80a and located closest to the cold water supply hole 82 in the circumferential direction. A straight line L2 is a straight line that passes through the point CP and a point P2. The point P2 is a point that is on the upper opening line 82a and located closest to the hot water supply hole 80 in the circumferential direction. A straight line L3 is a straight line that passes through the point CP, and is a bisector that bisects an angle formed by the straight lines L1 and L2 into two equal parts. The straight line L3 is a straight line that passes through the center (the point CP) of the fixed valve body 62 and the midpoint of the interval between the hot water supply hole 80 and the cold water supply hole 82.

The straight line L3 is one diameter of the smallest enclosing circle MC1. The straight line L3 divides the fixed valve body 62 into two regions. By the straight line L3, the fixed valve body 62 is divided into a hot water-side region Rh and a cold water-side region Rc. The hot water-side region Rh includes the entire hot water supply hole 80. The hot water-side region Rh includes the entire first lubricant retention portion 102a. The cold water-side region Rc includes the entire cold water supply hole 82. The cold water-side region Rc includes the entire second lubricant retention portion 102b.

A circle C1 is a circle that is centered at the point CP and passes through a radially outermost point on the upper opening line 80a. In the present embodiment, the circumference of the circle C1 coincides with a part of the upper opening line 80a. A circle C2 is a circle that is centered at the point CP and passes through a radially innermost point on the upper opening line 80a.

A circle C3 is a circle that is centered at the point CP and passes through a radially outermost point on the upper opening line 82a. In the present embodiment, the circumference of the circle C3 coincides with a part of the upper opening line 82a. A circle C4 is a circle that is centered at the point CP and passes through a radially innermost point on the upper opening line 82a. In the present embodiment, the circle C3 is identical to the circle C1.

The circumferentially extended region R1 of the hot water supply hole 80 is defined as a region that extends between the circles C1 and C2. In FIG. 6, the circumferentially extended region R1 is indicated by hatching with two-dot chain lines. The circumferentially extended region R1 extends along the circumferential direction on a side opposite to the cold water supply hole 82 and terminates at the straight line L3.

A circumferentially extended region R2 of the cold water supply hole 82 is defined as a region that extends between the circles C3 and C4. In FIG. 6, the circumferentially extended region R2 is indicated by hatching with dashed lines. The circumferentially extended region R2 extends along the circumferential direction on a side opposite to the hot water supply hole 80 and terminates at the straight line L3.

A part of the lubricant retention portion 102 is provided in the circumferentially extended region R1 of the hot water supply hole 80. Apart of the lubricant retention portion 102 is provided in the circumferentially extended region R2.

In the present embodiment, a part of the first lubricant retention portion 102a is provided in the circumferentially extended region R1 of the hot water supply hole 80. A part of the recess 104a is provided in the circumferentially extended region R1. The remaining part of the first lubricant retention portion 102a is located outside the circumferentially extended region R1. The entire external connection portion 106a is located outside the circumferentially extended region R1.

In the present embodiment, a part of the second lubricant retention portion 102b is provided in the circumferentially extended region R2 of the cold water supply hole 82. A part of the recess 104b is provided in the circumferentially extended region R2. The remaining part of the second lubricant retention portion 102b is located outside the circumferentially extended region R2. The entire external connection portion 106b is located outside the circumferentially extended region R2.

In the circumferentially extended region R1 of the hot water supply hole 80, only the first sliding surface PL1 is present between the hot water supply hole 80 and the lubricant retention portion 102 (the first lubricant retention portion 102a). In the circumferentially extended region R1, the drain hole 84 is not present between the hot water supply hole 80 and the first lubricant retention portion 102a. In the circumferentially extended region R2 of the cold water supply hole 82, only the first sliding surface PL1 is present between the cold water supply hole 82 and the lubricant retention portion 102 (the second lubricant retention portion 102b). In the circumferentially extended region R2, the drain hole 84 is not present between the cold water supply hole 82 and the second lubricant retention portion 102b.

A straight line L4 indicates a position where the distance between the hot water supply hole 80 and the lubricant retention portion 102 is the shortest. The length of the straight line L4 is the shortest distance D1 between the hot water supply hole 80 and the lubricant retention portion 102. In the present embodiment, the distance D1 is the shortest distance between the hot water supply hole 80 and the first lubricant retention portion 102a. The straight line L4 is also referred to as a "shortest distance line". The shortest distance line L4 is drawn on the first sliding surface PL1. Only the first sliding surface PL1 is present in a portion where the shortest distance line L4 is drawn.

A straight line L5 indicates a position where the distance between the cold water supply hole 82 and the lubricant retention portion 102 is the shortest. The length of the straight line L5 is the shortest distance D2 between the cold water supply hole 82 and the lubricant retention portion 102. In the present embodiment, the distance D2 is the shortest distance between the cold water supply hole 82 and the second lubricant retention portion 102b. The straight line L5 is also referred to as a "shortest distance line". The shortest distance line L5 is drawn on the first sliding surface PL1. Only the first sliding surface PL1 is present in a portion where the shortest distance line L5 is drawn.

The lubricant retention portions 102 each include a narrow portion 110 whose width is locally reduced. The narrow portion 110 is formed by a corner portion. The first lubricant retention portion 102a includes a narrow portion 110a. The second lubricant retention portion 102b includes a narrow portion 110b.

The narrow portion 110a (a highest point 126 thereof) of the lubricant retention portion 102a is located in the circumferentially extended region R1 of the hot water supply hole 80. The narrow portion 110b (a highest point 126 thereof) of the second lubricant retention portion 102b is located in the circumferentially extended region R2 of the cold water supply hole 82.

Figure 7:
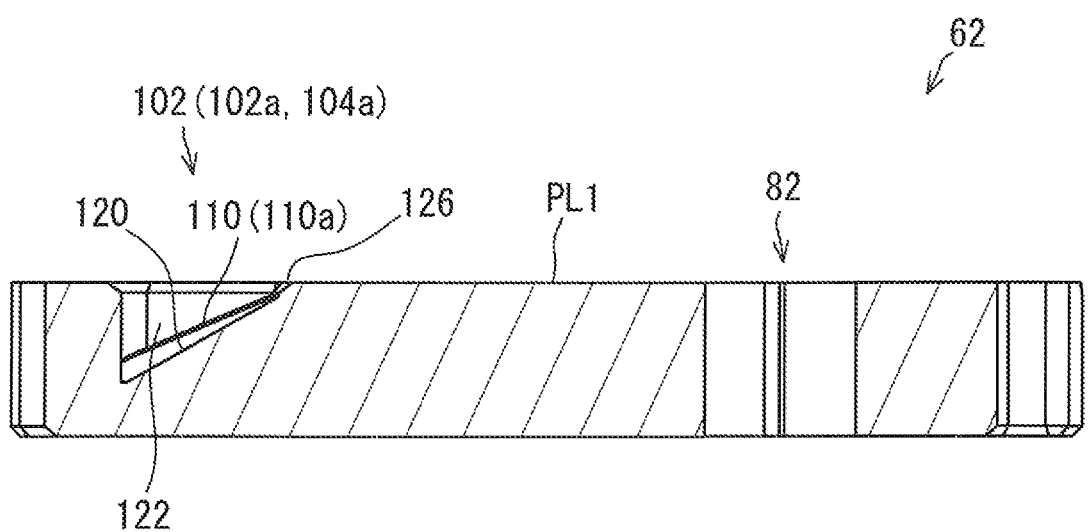
FIG. 7 is a cross-sectional view taken along line VII-VII in FIG. 4.

FIG. 7 is a cross-sectional view taken along line VII-VII in FIG. 4.

Referring now to FIGS. 3, 4, and 7, the lubricant retention portion 102 includes an inclined bottom surface 120, a first side surface 122, a second side surface 124, and a corner portion's highest point 126. The bottom surface 120 is inclined in such a manner that the depth of the lubricant retention portion 102 reduces toward the corner portion's highest point 126. The narrow portion 110 is formed by the corner portion where the side surface 122 and the bottom surface 120 intersect each other. The position of the narrow portion 110 becomes higher toward the corner portion's highest point 126 to eventually reach the corner portion's highest point 126. That is, the narrow portion 110 extends to the first sliding surface PL1. Although not shown in FIG. 7, the second lubricant retention portion 102b also includes such a narrow portion 110, bottom surface 120, first side surface 122, second side surface 124, and corner portion's highest point 126. In the vicinity of the corner portion's highest point 126, the first side surface 122 and the second side surface 124 are close to each other. The first side surface 122 and the second side surface 124 that are closely located to each other also serve to form the narrow portion 110 in the vicinity of the first sliding surface PL1.

Figure 8:
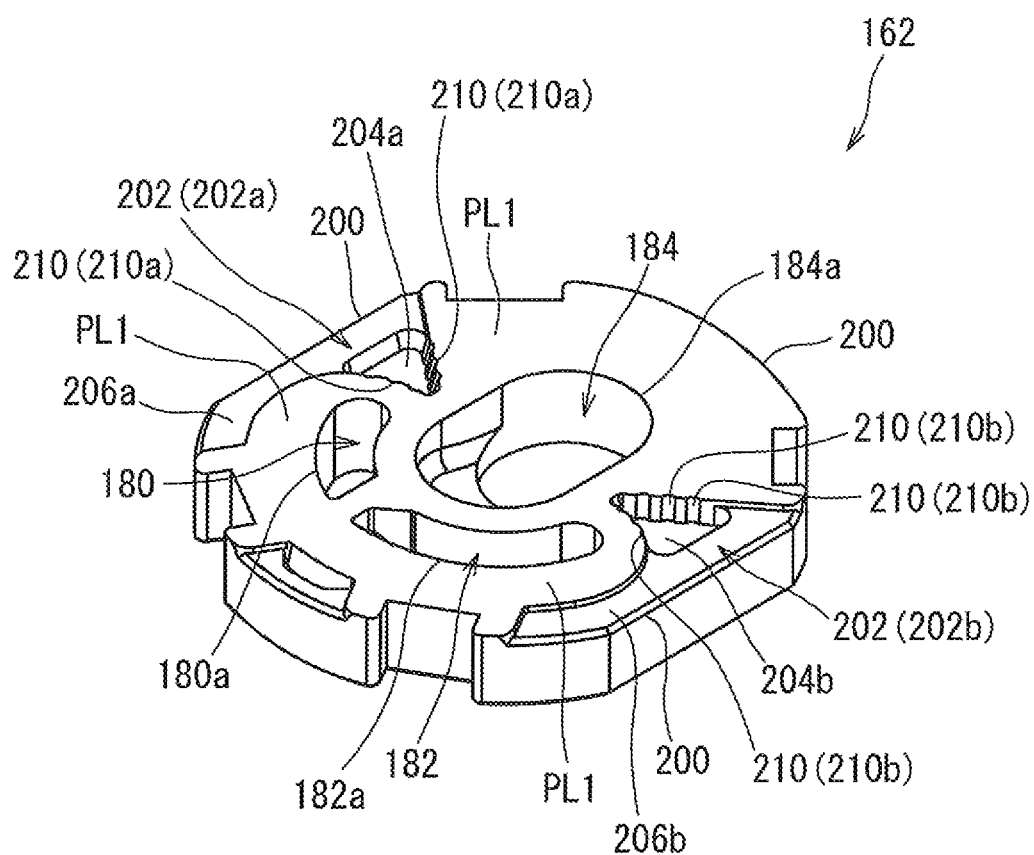
FIG. 8 is a perspective view of a fixed valve body according to a second embodiment.
Figure 9:
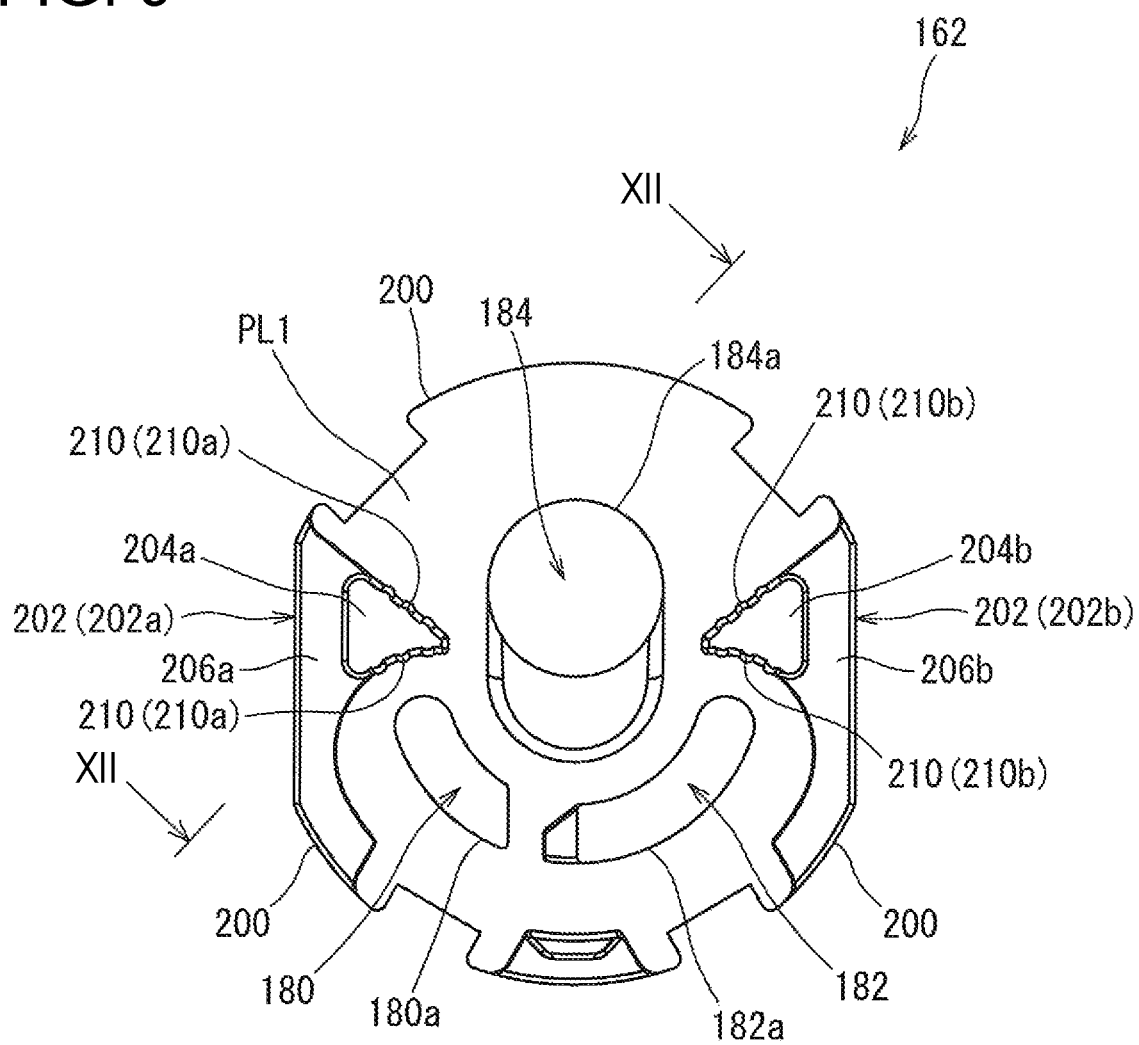
FIG. 9 is a plan view of the fixed valve body according to the second embodiment.
Figure 10:
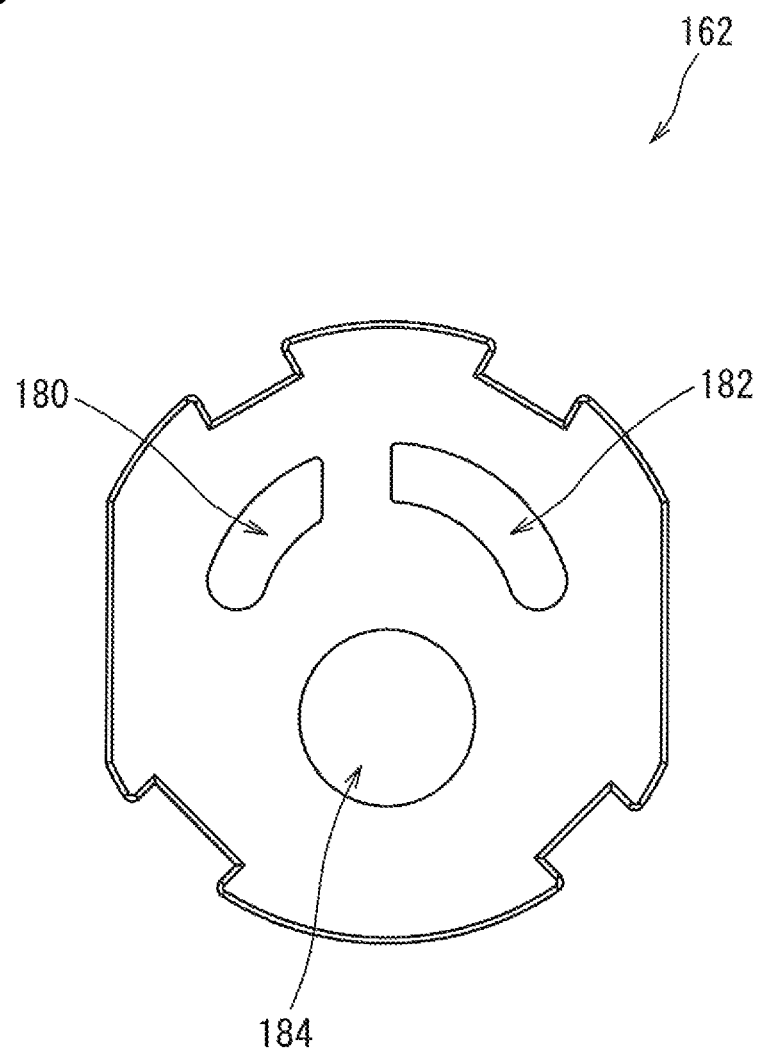
FIG. 10 is a bottom view of the fixed valve body according to the second embodiment.

FIG. 8 is a perspective view of a fixed valve body 162 of a mixer faucet according to a second embodiment. FIG. 9 is a plan view of the fixed valve body 162. FIG. 10 is a bottom view of the fixed valve body 162. Except for the fixed valve body 162, the configuration of the mixer faucet of the second embodiment is the same as the configuration of the mixer faucet 10 of the first embodiment.

The fixed valve body 162 includes a hot water supply hole 180, a cold water supply hole 182, and a drain hole 184. The hot water supply hole 180 penetrates through the fixed valve body 162. The hot water supply hole 180 has an upper opening line 180a. The upper opening line 180a is the outline of the hot water supply hole 180 on a first sliding surface PL1. The upper opening line 180a is the outline of an upper opening of the hot water supply hole 180.

The cold water supply hole 182 has an upper opening line 182a. The upper opening line 182a is the outline of the cold water supply hole 182 on the first sliding surface PL1. The upper opening line 182a is the outline of an upper opening of the cold water supply hole 182.

The drain hole 184 has an upper opening line 184a. The upper opening line 184a is the outline of the drain hole 184 on the first sliding surface PL1. The upper opening line 184a is the outline of an upper opening of the drain hole 184.

The first sliding surface PL1 is provided on the upper surface of the fixed valve body 162. The first sliding surface PL1 is a flat surface. The first sliding surface PL1 is formed in a portion where the holes 180, 182, and 184 and lubricant retention portions (to be described below) are not present.

The fixed valve body 162 has an outer edge 200. The upper opening line 180a of the hot water supply hole 180 does not extend to the outer edge 200. That is, the hot water supply hole 180 is not connected to the outside of the fixed valve body 162. The entire hot water supply hole 180 is surrounded by the first sliding surface PL1. The upper opening line 182a of the cold water supply hole 182 is not connected to the outer edge 200. That is, the cold water supply hole 182 is not connected to the outside of the fixed valve body 162. The entire cold water supply hole 182 is surrounded by the first sliding surface PL1. The upper opening line 184a of the drain hole 184 is not connected to the outer edge 200. That is, the drain hole 184 is not connected to the outside of the fixed valve body 162. The entire drain hole 184 is surrounded by the first sliding surface PL1.

The fixed valve body 162 includes lubricant retention portions 202. The lubricant retention portions 202 are provided on the upper surface of the fixed valve body 162. The lubricant retention portions 202 form surfaces that are lower than the first sliding surface PL1. Although not shown in the drawings, the lubricant retention portions 202 contain grease as a lubricant.

The lubricant retention portions 202 include a first lubricant retention portion 202a and a second lubricant retention portion 202b.

The first lubricant retention portion 202a is located near the hot water supply hole 180. The shortest distance between the first lubricant retention portion 202a and the hot water supply hole 180 is smaller than the shortest distance between the second lubricant retention portion 202b and the hot water supply hole 180. The shortest distance between the first lubricant retention portion 202a and the hot water supply hole 180 is smaller than the shortest distance between the first lubricant retention portion 202a and the drain hole 184. Only the first sliding surface PL1 is present between the first lubricant retention portion 202a and the drain hole 184.

The second lubricant retention portion 202b is located near the cold water supply hole 182. The shortest distance between the second lubricant retention portion 202b and the cold water supply hole 182 is smaller than the shortest distance between the first lubricant retention portion 202a and the cold water supply hole 182. The shortest distance between the second lubricant retention portion 202b and the cold water supply hole 182 is smaller than the shortest distance between the second lubricant retention portion 202b and the drain hole 184. Only the first sliding surface PL1 is present between the second lubricant retention portion 202b and the cold water supply hole 182.

The first lubricant retention portion 202a has a recess 204a. The first lubricant retention portion 202a also has an external connection portion 206a. The external connection portion 206a forms a surface that is lower than the first sliding surface PL1, and is connected to the outer edge 200. The recess 204a is connected to the external connection portion 206a. According to the comparison between the depths of the recess 204a and the external connection portion 206a as measured from the first sliding surface PL1, the recess 204a is deeper than the external connection portion 206a.

The second lubricant retention portion 202b has a recess 204b. The second lubricant retention portion 202b also has an external connection portion 206b. The external connection portion 206b forms a surface that is lower than the first sliding surface PL1, and is connected to the outer edge 200. The recess 204b is connected to the external connection portion 206b. According to the comparison between the depths of the recess 204b and the external connection portion 206b as measured from the first sliding surface PL1, the recess 204b is deeper than the external connection portion 206b.

The first lubricant retention portion 202a and the second lubricant retention portion 202b are symmetrical to each other. In the plan view (FIG. 9), the first lubricant retention portion 202a and the second lubricant retention portion 202b are in a line-symmetric relationship.

Figure 11:
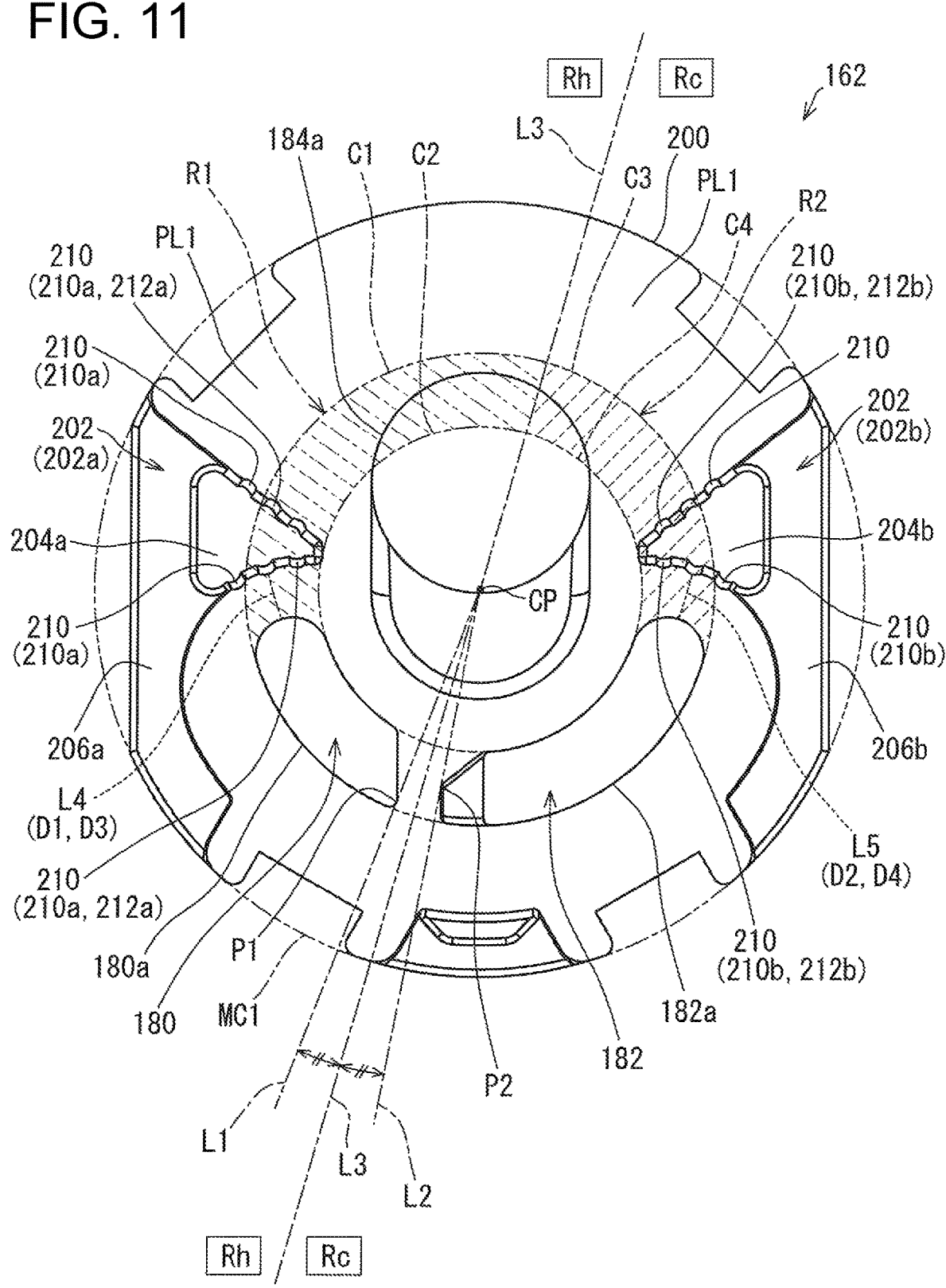
FIG. 11 is an enlarged plan view of the fixed valve body according to the second embodiment.

FIG. 11 is an enlarged plan view of the fixed valve body 162.

Similarly to the above-described fixed valve body 62, the fixed valve body 162 also has the following regions (a) and (b).

(a) a circumferentially extended region R1 of the hot water supply hole 180
(b) a circumferentially extended region R2 of the cold water supply hole 182

In FIG. 11, CP indicates the center of the smallest enclosing circle MC1. A straight line L1 is a straight line that passes through the point CP and a point P1. The point P1 is a point that is on the upper opening line 180a and located closest to the cold water supply hole 182 in the circumferential direction. A straight line L2 is a straight line that passes through the point CP and a point P2. The point P2 is a point that is on the upper opening line 182a and located closest to the hot water supply hole 180 in the circumferential direction. A straight line L3 is a straight line that passes through the point CP, and is a bisector that bisects an angle formed by the straight lines L1 and L2 into two equal parts.

The straight line L3 is one diameter of the smallest enclosing circle MC1. The straight line L3 divides the fixed valve body 162 into two regions. By the straight line L3, the fixed valve body 162 is divided into a hot water-side region Rh and a cold water-side region Rc. The hot water-side region Rh includes the entire hot water supply hole 180. The hot water-side region Rh includes the entire first lubricant retention portion 202a. The cold water-side region Rc includes the entire cold water supply hole 182. The cold water-side region Rc includes the entire second lubricant retention portion 202b.

A circle C1 is a circle that is centered at the point CP and passes through a radially outermost point on the upper opening line 180a. In the present embodiment, the circumference of the circle C1 coincides with a part of the upper opening line 180a. A circle C2 is a circle that is centered at the point CP and passes through a radially innermost point on the upper opening line 180a. In the present embodiment, the circumference of the circle C2 coincides with a part of the upper opening line 180a.

A circle C3 is a circle that is centered at the point CP and passes through a radially outermost point on the upper opening line 182a. In the present embodiment, the circumference of the circle C3 coincides with a part of the upper opening line 182a. A circle C4 is a circle that is centered at the point CP and passes through a radially innermost point on the upper opening line 182a. In the present embodiment, the circumference of the circle C4 coincides with a part of the upper opening line 182a. In the present embodiment, the circle C3 is identical to the circle C1, and the circle C4 is identical to the circle C2.

As described above, the circumferentially extended region R1 of the hot water supply hole 180 is a region that extends between the circles C1 and C2. In FIG. 11, the circumferentially extended region R1 is indicated by hatching with two-dot chain lines.

As described above, the circumferentially extended region R2 of the cold water supply hole 182 is a region that extends between the circles C3 and C4. In FIG. 11, the circumferentially extended region R2 is indicated by hatching with dashed lines.

A part of the lubricant retention portion 202 is provided in the circumferentially extended region R1 of the hot water supply hole 180. A part of the lubricant retention portion 202 is provided in the circumferentially extended region R2 of the cold water supply hole 182.

In the present embodiment, a part of the first lubricant retention portion 202a is provided in the circumferentially extended region R1 of the hot water supply hole 180. A part of the recess 204a is provided in the circumferentially extended region R1. The remaining part of the first lubricant retention portion 202a is located outside the circumferentially extended region R1. The entire external connection portion 206a is located outside the circumferentially extended region R1.

In the present embodiment, a part of the second lubricant retention portion 202b is provided in the circumferentially extended region R2 of the cold water supply hole 182. A part of the recess 204b is provided in the circumferentially extended region R2. The remaining part of the second lubricant retention portion 202b is located outside the circumferentially extended region R2. The entire external connection portion 206b is located outside the circumferentially extended region R2.

In the circumferentially extended region R1 of the hot water supply hole 180, only the first sliding surface PL1 is present between the hot water supply hole 180 and the lubricant retention portion 202 (the first lubricant retention portion 202a). In the circumferentially extended region R1, the drain hole 184 is not present between the hot water supply hole 180 and the first lubricant retention portion 202a. In the circumferentially extended region R2 of the cold water supply hole 182, only the first sliding surface PL1 is present between the cold water supply hole 182 and the lubricant retention portion 202 (the second lubricant retention portion 202b). In the circumferentially extended region R2, the drain hole 184 is not present between the cold water supply hole 182 and the second lubricant retention portion 202b.

A straight line L4 indicates a position where the distance between the hot water supply hole 180 and the lubricant retention portion 202 is the shortest. The length of the straight line L4 is the shortest distance D1 between the hot water supply hole 180 and the lubricant retention portion 202. In the present embodiment, the distance D1 is the shortest distance between the hot water supply hole 180 and the first lubricant retention portion 202a. A straight line L5 indicates a position where the distance between the cold water supply hole 182 and the lubricant retention portion 202 is the shortest. The length of the straight line L5 is the shortest distance D2 between the cold water supply hole 182 and the lubricant retention portion 202. In the present embodiment, the distance D2 is the shortest distance between the cold water supply hole 182 and the second lubricant retention portion 202b.

The lubricant retention portions 202 include narrow portions 210 whose width is locally reduced. The narrow portions 210 are formed by grooves. The first lubricant retention portion 202a includes narrow portions 210a. The second lubricant retention portion 202b includes narrow portions 210b.

The narrow portions 210a of the first lubricant retention portion 202a include narrow portions 212a provided in the circumferentially extended region R1. The narrow portions 210b of the second lubricant retention portion 202b include narrow portions 212b provided in the circumferentially extended region R2 of the cold water supply hole 182.

Figure 12:
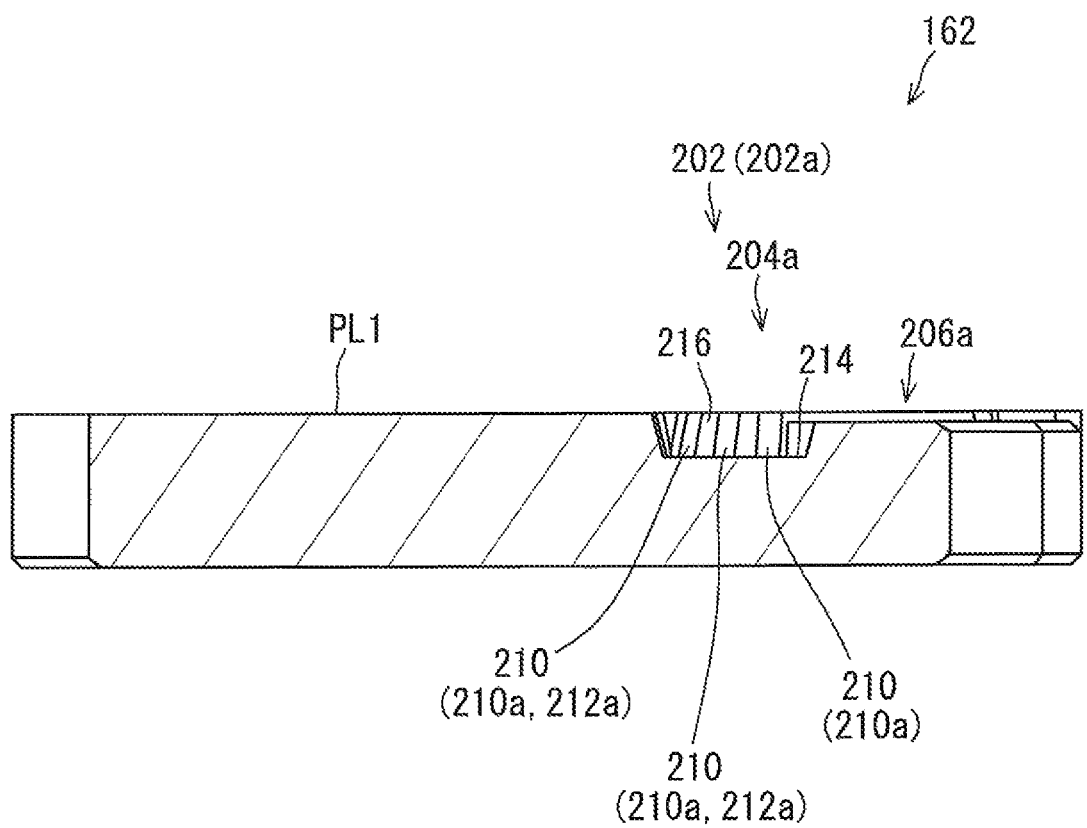
FIG. 12 is a cross-sectional view taken along line XII-XII in FIG. 9.

FIG. 12 is a cross-sectional view taken along line XII-XII in FIG. 9. The lubricant retention portion 202 includes a bottom surface 214 and a side surface 216. The side surface 216 extends between the bottom surface 214 and the first sliding surface PL1. The narrow portions 210 formed by the grooves extend downward from the first sliding surface PL1. The narrow portions 210 are provided on the side surface 216. The narrow portions 210 extend from the first sliding surface PL1 to the bottom surface 214.

Figure 13:
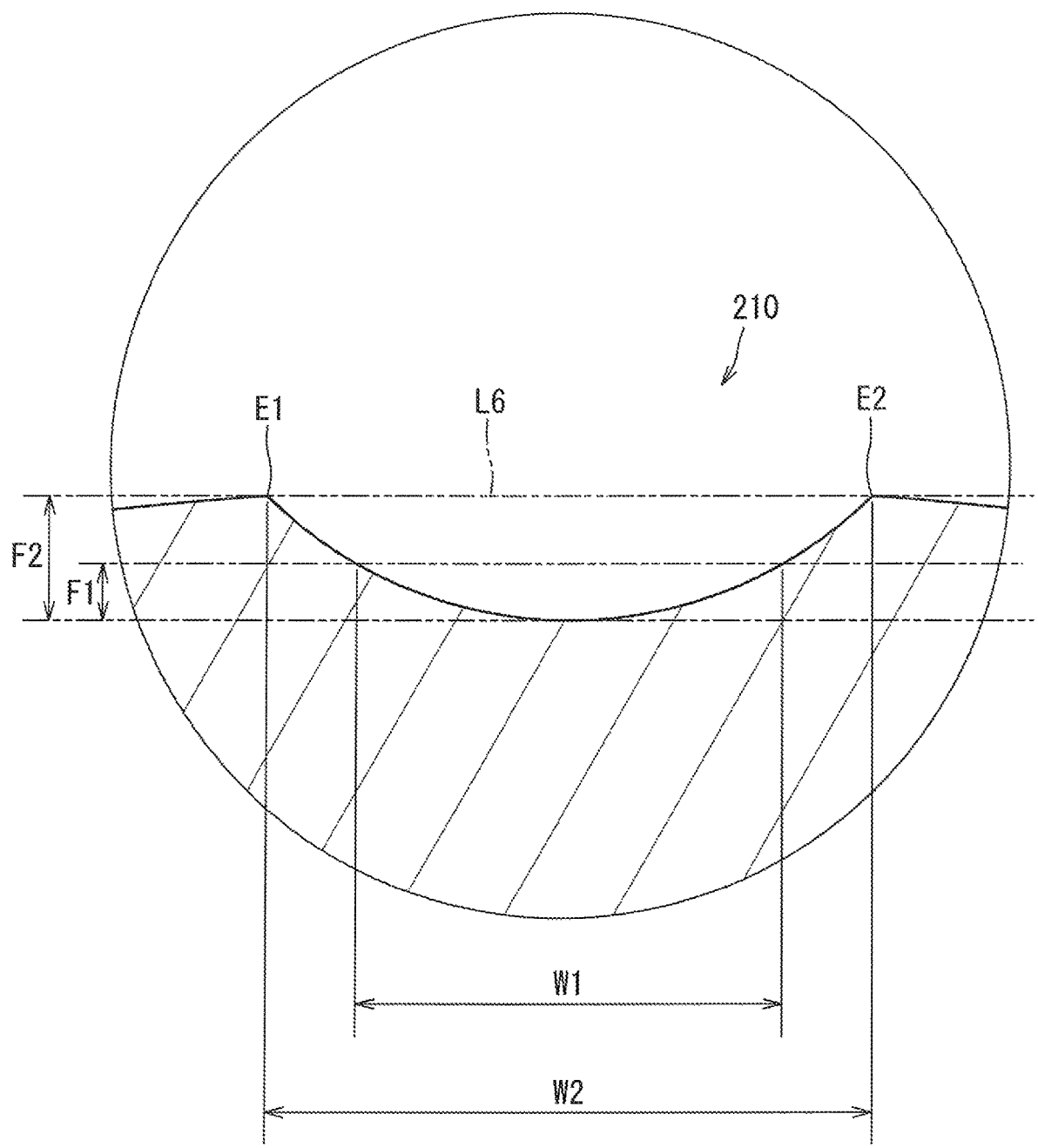
FIG. 13 is an enlarged cross-sectional view of a narrow portion according to the second embodiment.

FIG. 13 is an enlarged cross-sectional view of one narrow portion 210. This cross section is parallel to the first sliding surface PL1.

As described above, each narrow portion 210 is a groove. The narrow portion 210 has a width W1 at a depth of F1 mm. F1 mm may be set to 0.03 mm. The width W1 is measured on a cross section that is parallel to the first sliding surface PL1. On this cross section, a first endpoint E1 and a second endpoint E2 of the narrow portion 210 and a straight line L6 that connects the first endpoint E1 and the second endpoint E2 are determined. The width W1 is measured along a direction parallel to the straight line L6. The depth F1 is measured along a direction perpendicular to the straight line L6. The narrow portion 210 has a width W2. The width W2 is the length of a line segment between the first endpoint E1 and the second endpoint E2. The width W2 is measured on a cross section that is parallel to the first sliding surface PL1. In the narrow portion 210, the width W2 is the groove width (the opening width of the groove). The narrow portion 210 has a depth of F2. In the narrow portion 210, the depth F2 is the depth of the groove. The depth F2 is measured along a direction perpendicular to the straight line L6.

In the above-described cross-sectional view, the first endpoint E1 and the second endpoint E2 are edges. In the case where the first endpoint E1 cannot be clearly defined owing to its roundness, the center point of a portion having the smallest radius of curvature may be defined as the first endpoint E1. Likewise, in the case where the second endpoint E2 cannot be clearly defined owing to its roundness, the center point of a portion having the smallest radius of curvature may be defined as the second endpoint E2.

Figure 14:
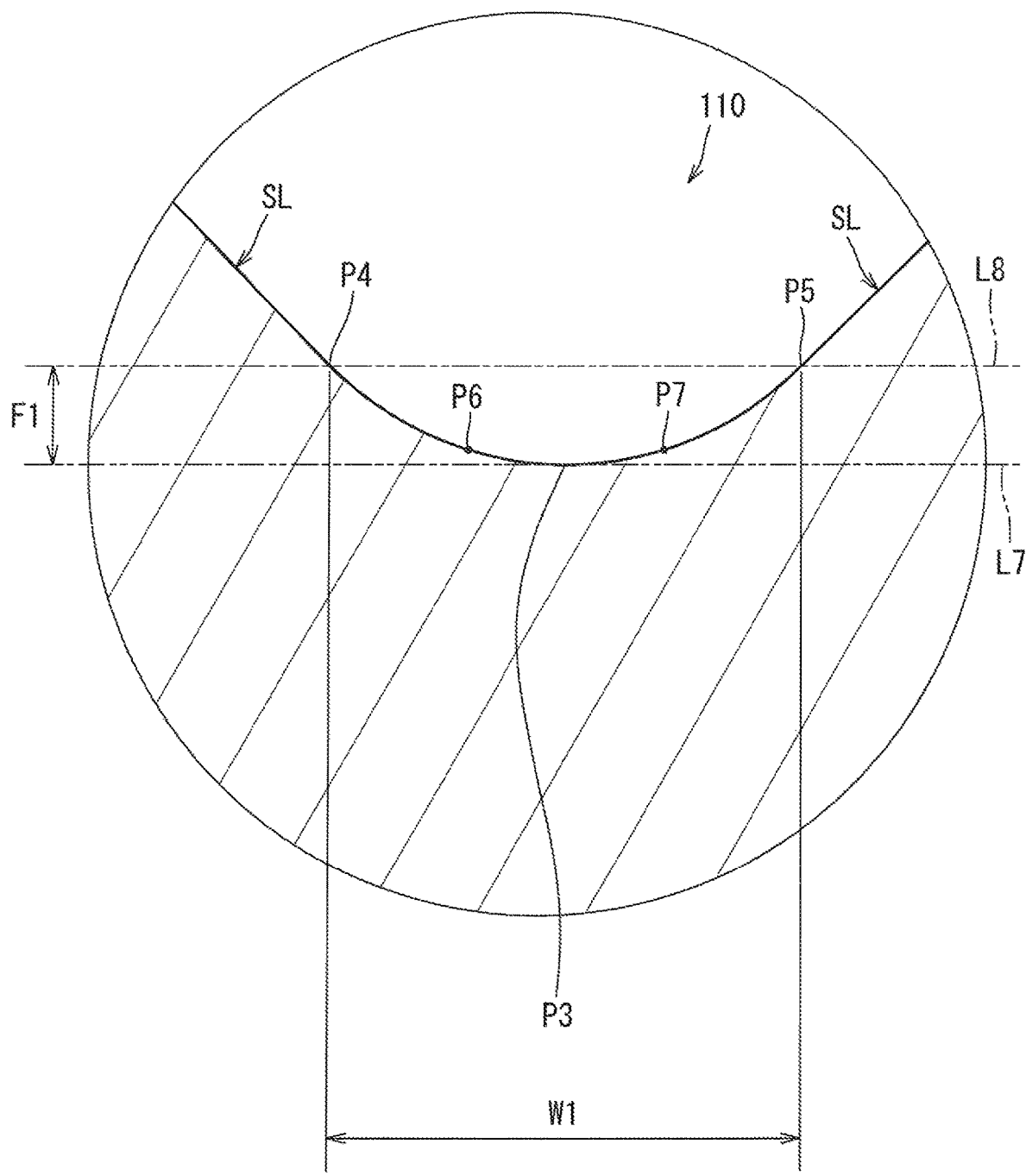
FIG. 14 is an enlarged cross-sectional view of a narrow portion according to the first embodiment.

FIG. 14 is an enlarged cross-sectional view of the narrow portion 110. This cross section is parallel to the first sliding surface PL1.

As described above, the narrow portion 110 is not a groove but a corner portion. The narrow portion 110 has a width W1 at a depth of F1 mm. F1 mm may be set to 0.03 mm. The width W1 is measured on a cross section that is parallel to the first sliding surface PL1.

The narrow portion 110 does not have the first endpoint E1 and the second endpoint E2 shown in FIG. 13. In this case, a lowest point P3 of the narrow portion 110, a tangent line L7 to the narrow portion 110 at the lowest point P3, and a straight line L8 that is parallel to the tangent line L7 and is apart from the tangent line L7 by a distance F1 of 0.03 mm are determined. Intersection points P4 and P5 of the straight line L8 and a cross-sectional contour line SL of the narrow portion 110 are determined. The distance between the points P4 and P5 is defined as the above-described width W1.

The lowest point P3 may be the midpoint of a portion having the smallest radius of curvature. In the present embodiment, the smallest radius of curvature is 0.1 mm, and the tangent line L7 thus can be drawn. When the lowest point P3 is located at an angled corner, it is not possible to define the tangent line L7 as a tangent line to the cross-sectional contour line SL. In this case, a point P6 that is located on one side of the point P3 and is apart from the point P3 by a path length of 0.03 mm, and a point P7 that is located on the other side of the point P3 and is apart from the point P3 by a path length of 0.03 mm may be determined. A circle that passes through the three points, namely, P3, P6 and P7, is determined, and a tangent line to this circle at the point P3 is regarded as the tangent line L7. The path length means a distance that is measured along the cross-sectional contour line SL.

As described above, in the first and second embodiments, at least a part of the lubricant retention portion is provided in the circumferentially extended region R1 of the hot water supply hole and the circumferentially extended region R2 of the cold water supply hole.

In the water discharge state, water flow is strong around the hot water supply hole and the cold water supply hole. In addition, these regions are often subjected to water flow.

Accordingly, outflow of a lubricant on the first sliding surface PL1 is likely to occur around the hot water supply hole and the cold water supply hole. In the water discharge state, the hot-and-cold water mixer recess of the movable valve body overlaps the hot water supply hole and/or the cold water supply hole and the drain hole in such a manner that the hot-and-cold water mixer recess extends continuously over the hot water supply hole and/or the cold water supply hole and the drain hole. Accordingly, the lubricant on the first sliding surface PL1 is particularly likely to flow out from between the hot water supply hole and the drain hole, between the cold water supply hole and the drain hole, and between the hot water supply hole and the cold water supply hole. In the embodiment shown in FIG. 6, outflow of a lubricant is particularly likely to occur in a region radially inside the hot water supply hole 80, a region radially inside the cold water supply hole 82, and a region between the hot water supply hole 80 and the cold water supply hole 82. These regions frequently slide against the movable valve body 60 and thus are more susceptible to abrasion in the absence of a lubricant. Besides, since these regions are close to the hot water supply hole and the cold water supply hole, they tend to be exposed to high water pressure. If abrasions are caused in these regions, water leakage is likely to occur.

By providing at least a part of the lubricant retention portion in the circumferentially extended region R1 of the hot water supply hole and the circumferentially extended region R2 of the cold water supply hole, the lubricant contained in the lubricant retention portion is effectively supplied to the portions where the outflow of the lubricant is likely to occur. As described above, forward and rearward turning operations of the lever handle cause relative movement of the movable valve body with respect to the fixed valve body, and leftward and rightward turning operations of the lever handle cause relative rotation of the movable valve body with respect to the fixed valve body. Owing to these relative movement and relative rotation, the lubricant that has supplied to the circumferentially extended regions R1 and R2 tends to move to regions around the hot water supply hole and the cold water supply hole on the first sliding surface PL1. The lubricant that has supplied to the circumferentially extended region R1 tends to move to the region radially inside the hot water supply hole on the first sliding surface PL1. The lubricant that has supplied to the circumferentially extended region R2 tends to move to the region radially inside the cold water supply hole on the first sliding surface PL1. With this configuration, the lubricant is effectively supplied to portions where the outflow of the lubricant is likely to occur.

In the embodiment shown in FIG. 6, in the circumferentially extended region R1, only the first sliding surface PL1 is present between the hot water supply hole 80 and the first lubricant retention portion 102a. Also in the embodiment shown in FIG. 11, in the circumferentially extended region R1, only the first sliding surface PL1 is present between the hot water supply hole 180 and the first lubricant retention portion 202a. Accordingly, the lubricant from the lubricant retention portions can smoothly reach a region around the hot water supply hole.

In the embodiment shown in FIG. 6, in the circumferentially extended region R2, only the first sliding surface PL1 is present between the cold water supply hole 82 and the second lubricant retention portion 102b. Also in the embodiment shown in FIG. 11, in the circumferentially extended region R2, only the first sliding surface PL1 is present between the cold water supply hole 182 and the second lubricant retention portion 202b. Accordingly, the lubricant from the lubricant retention portions can smoothly reach a region around the cold water supply hole.

The narrow portion causes capillary action. In the narrow portion, capillary action is facilitated as compared with capillary actions in other portions of the lubricant retention portion. The narrow portion draws up the lubricant contained therein upward through capillary action. When the amount of the lubricant is reduced and the upper surface of the lubricant is lowered in the lubricant retention portion, the lubricant cannot be smoothly supplied to the first sliding surface PL1. However, by utilizing the capillary action, the lubricant can be efficiently supplied to the first sliding surface PL1 even when the upper surface of the lubricant is lowered.

As described above, the lubricant retention portion has a capillary action promoting portion in which capillary action for drawing up the lubricant contained therein toward the first sliding surface PL1 is caused more easily than in other portions of the lubricant retention portion. The narrow portions 110 and 210 are illustrative examples of such a capillary action promoting portion.

In the embodiment shown in FIG. 6, the narrow portion 110a is a hot water-side narrow portion provided in the circumferentially extended region R1 of the hot water supply hole 80, and the narrow portion 110b is a cold water-side narrow portion provided in the circumferentially extended region R2 of the cold water supply hole 82. In the embodiment shown in FIG. 11, the narrow portions 212a are hot water-side narrow portions provided in the circumferentially extended region R1 of the hot water supply hole 180, and the narrow portions 212b are cold water-side narrow portions provided in the circumferentially extended region R2 of the cold water supply hole 182. By providing the narrow portion in the circumferentially extended region R1 of the hot water supply hole, the efficiency of supplying the lubricant to the regions where the outflow of the lubricant is likely to occur is further improved. Similarly, by providing the narrow portion in the circumferentially extended region R2 of the cold water supply hole, the efficiency of supplying the lubricant to the regions where the outflow of the lubricant is likely to occur is further improved. Moreover, since the narrow portions allow the lubricant to be supplied to desired positions, the lubricant can be supplied concentratedly to target portions.

In the embodiment shown in FIG. 6, the first lubricant retention portion 102a includes the recess 104a and the external connection portion 106a. The recess 104a is deep and thus can retain a large amount of lubricant. Further, since the narrow portion 110a is provided in the recess 104a, capillary action enables effectively supply of the lubricant even when the amount of the lubricant is reduced to increase the difference in height between the upper surface of the lubricant and the first sliding surface PL1. The external connection portion 106a serves to increase the area of the first lubricant retention portion 102a, thereby increasing the amount of the lubricant that the first lubricant retention portion 102a can retain. Since the external connection portion 106a extends to the outer edge 100, the area of the external connection portion 106a is enlarged. Since the external connection portion 106a is connected to the recess 104a, the lubricant contained in the external connection portion 106a is successively supplied to the recess 104a. This allows the lubricant to be supplied over a long period of time. The second lubricant retention portion 102b also exhibits the same effects.

The surface of the fixed valve body has a higher interfacial tension than the lubricant. The narrow portion efficiently draws up the lubricant contained therein through capillary action.

As shown in FIGS. 6 and 11, the shortest distance between the hot water supply hole and the lubricant retention portion is defined as D1, and the shortest distance between the cold water supply hole and the lubricant retention portion is defined as D2. From the viewpoint of supplying the lubricant around the hot water supply hole and around the cold water supply hole in a well-balanced manner, D1/D2 is preferably greater than or equal to 0.5, more preferably greater than or equal to 0.7, and still more preferably greater than or equal to 0.9. From the viewpoint of supplying the lubricant around the hot water supply hole and around the cold water supply hole in a well-balanced manner, D1/D2 is preferably less than or equal to 2, more preferably less than or equal to 1.5, and still more preferably less than or equal to 1.2. In the embodiment shown in FIG. 6, D1/D2 is 1. In the embodiment shown in FIG. 11, D1/D2 is 1.

From the viewpoint of efficiently supplying the lubricant to the vicinity of the hot water supply hole, the shortest distance D1 is preferably less than or equal to 7 mm, more preferably less than or equal to 5 mm, still more preferably less than or equal to 3.5 mm, yet more preferably less than or equal to 3.0 mm, and even more preferably less than or equal to 2.5 mm. From the viewpoint of securing the width of the first sliding surface PL1 to prevent the occurrence of water leakage, the shortest distance D1 is preferably greater than or equal to 0.5 mm, more preferably greater than or equal to 1.0 mm, and still more preferably greater than or equal to 1.5 mm. In the embodiment shown in FIG. 6, the shortest distance D1 is 1.95 mm. In the embodiment shown in FIG. 11, the shortest distance D1 is 1.95 mm.

From the viewpoint of efficiently supplying the lubricant to the vicinity of the cold water supply hole, the shortest distance D2 is preferably less than or equal to 7 mm, more preferably less than or equal to 5 mm, still more preferably less than or equal to 3.5 mm, yet more preferably less than or equal to 3.0 mm, and even more preferably less than or equal to 2.5 mm. From the viewpoint of securing the width of the first sliding surface PL1 to prevent the occurrence of water leakage, the shortest distance D2 is preferably greater than or equal to 0.5 mm, more preferably greater than or equal to 1.0 mm, and still more preferably greater than or equal to 1.5 mm. In the embodiment shown in FIG. 6, the shortest distance D2 is 1.95 mm. In the embodiment shown in FIG. 11, the shortest distance D2 is 1.95 mm.

The shortest distance between the narrow portion and the hot water supply hole is defined as D3. In the embodiment shown in FIG. 6, the shortest distance D3 is identical to the shortest distance D1. Also in the embodiment shown in FIG. 11, the shortest distance D3 is identical to the shortest distance D1.

From the viewpoint of supplying the lubricant to a portion radially inside the hot water supply hole, the shortest distance D3 is preferably less than or equal to 7 mm, more preferably less than or equal to 5 mm, still more preferably less than or equal to 3.5 mm, yet more preferably less than or equal to 3.0 mm, and even more preferably less than or equal to 2.5 mm. From the viewpoint of securing the width of the first sliding surface PL1 to prevent the occurrence of water leakage, the shortest distance D3 is preferably greater than or equal to 0.5 mm, more preferably greater than or equal to 1.0 mm, and still more preferably greater than or equal to 1.5 mm.

The shortest distance between the narrow portion and the cold water supply hole is defined as D4. In the embodiment shown in FIG. 6, the shortest distance D4 is identical to the shortest distance D2. Also in the embodiment shown in FIG. 11, the shortest distance D4 is identical to the shortest distance D2.

From the viewpoint of supplying the lubricant to a portion radially inside the cold water supply hole, the shortest distance D4 is preferably less than or equal to 7 mm, more preferably less than or equal to 5 mm, still more preferably less than or equal to 3.5 mm, yet more preferably less than or equal to 3.0 mm, and even more preferably less than or equal to 2.5 mm. From the viewpoint of securing the width of the first sliding surface PL1 to prevent the occurrence of water leakage, the shortest distance D4 is preferably greater than or equal to 0.5 mm, more preferably greater than or equal to 1.0 mm, and still more preferably greater than or equal to 1.5 mm.

As shown in FIG. 11, of the plurality of narrow portions 210, the narrow portion(s) 210 located closest to the hot water supply hole 180 is provided in the circumferentially extended region R1. Further, of the plurality of narrow portions 210, the narrow portion(s) 210 located closest to the cold water supply hole 182 is provided in the circumferentially extended region R2. With this configuration, the lubricant can be efficiently supplied around the hot water supply hole 80 and around the cold water supply hole 82.

The area of the first sliding surface PL1 is defined as M1. The area M1 is the area of the entire flat surface that is flush with a contact portion that can come into contact with the second sliding surface PL2. The area of the lubricant retention portion is defined as M2. When a plurality of lubricant retention portions are provided as in the embodiments shown in FIGS. 6 and 11, the area M2 is the sum of the areas of these lubricant retention portions. The areas M1 and M2 are measured in a plan view like the ones shown in FIGS. 6 and 11.

From the viewpoint of increasing the amount of the lubricant that the lubricant retention portion can retain, M2/M1 is preferably greater than or equal to 0.05, more preferably greater than or equal to 0.1, still more preferably greater than or equal to 0.15, and yet more preferably greater than or equal to 0.20. From the viewpoint of securing the area of the first sliding surface PL1 to suppress the occurrence of water leakage, M2/M1 is preferably less than or equal to 0.40, more preferably less than or equal to 0.35, and still more preferably less than or equal to 0.30. In the embodiment shown in FIG. 6, M2/M1 is set to 0.25. In the embodiment shown in FIG. 11, M2/M1 is set to 0.25.

When the first and second lubricant retention portions are provided as in the above-described embodiments, each lubricant retention portion preferably has a large area from the viewpoint of supplying the lubricant contained therein over a long period of time.

The area of the first lubricant retention portion is defined as M3, and the area of the second lubricant retention portion is defined as M4. The areas M3 and M4 are measured in plan views like the ones shown in FIGS. 6 and 11. From the viewpoint of increasing the amount of a lubricant that a single lubricant retention portion can retain, M3/M1 is preferably greater than or equal to 0.01, more preferably greater than or equal to 0.03, still more preferably greater than or equal to 0.05, and yet more preferably greater than or equal to 0.07. From the viewpoint of securing the area of the first sliding surface PL1 to suppress the occurrence of water leakage, M3/M1 is preferably less than or equal to 0.20, more preferably less than or equal to 0.18, and still more preferably less than or equal to 0.15. From the viewpoint of increasing the amount of a lubricant that a single lubricant retention portion can retain, M4/M1 is preferably greater than or equal to 0.01, more preferably greater than or equal to 0.03, still more preferably greater than or equal to 0.05, and yet more preferably greater than or equal to 0.07. From the viewpoint of securing the area of the first sliding surface PL1 to suppress the occurrence of water leakage, M4/M1 is preferably less than or equal to 0.20, more preferably less than or equal to 0.18, and still more preferably less than or equal to 0.15. In the embodiment shown in FIG. 6, M3/M1 and M4/M1 are set to 0.13. In the embodiment shown in FIG. 11, M3/M1 and M4/M1 are set to 0.13.

As described above, FIGS. 13 and 14 each show the width W1. From the viewpoint of enhancing the capillary action, the width W1 of the narrow portion at a position where the depth F1 is 0.03 mm is preferably less than or equal to 0.7 mm, more preferably less than or equal to 0.5 mm, still more preferably less than or equal to 0.45 mm, and yet more preferably less than or equal to 0.4 mm. Considering the amount of lubricant supply, the width W1 is preferably greater than or equal to 0.2 mm, more preferably greater than or equal to 0.25 mm, and still more preferably greater than or equal to 0.3 mm. In the embodiment shown in FIG. 6, the width W1 is set to 0.34 mm. In the embodiment shown in FIG. 11, the width W1 is set to 0.34 mm.

From the viewpoint of enhancing the capillary action, the width W2 of the narrow portion is preferably less than or equal to 1.0 mm, more preferably less than or equal to 0.9 mm, and still more preferably less than or equal to 0.8 mm. Considering the amount of lubricant supply, the width W2 is preferably greater than or equal to 0.4 mm, more preferably greater than or equal to 0.5 mm, and still more preferably greater than or equal to 0.6 mm. In the embodiment shown in FIG. 11, the width W2 is set to 0.7 mm.

From the viewpoint of enhancing the capillary action, the depth F2 of the narrow portion is preferably greater than or equal to 0.08 mm, more preferably greater than or equal to 0.10 mm, and still more preferably greater than or equal to 0.12 mm. Considering the formability of the fixed valve body, it is not preferable that the depth F2 is excessively large. From this viewpoint, the depth F2 is preferably less than or equal to 0.2 mm, more preferably less than or equal to 0.18 mm, and still more preferably less than or equal to 0.16 mm. In the embodiment shown in FIG. 11, the depth F2 is set to 0.14 mm.

When the material of the fixed valve body is exposed on the surface, the surface of the fixed valve body has a higher interfacial tension than the lubricant (grease or the like). This configuration facilitates the capillary action for drawing up the lubricant.

The lubricant retention portion may have a surface coating that has a lower interfacial tension than the material of the fixed valve body, and the surface coating may be provided in a portion other than the narrow portion. According to this configuration, since the surface of the narrow portion is made of the material of the fixed valve body, the interfacial tension of the surface coating is lower than that of the narrow portion. As a result, the lubricant contained in the lubricant retention portion is more likely to adhere to the narrow portion than to the surface coating, whereby the supply of the lubricant from the narrow portion can be promoted. The surface coating may be provided on the entirety of the portion other than the narrow portion in the lubricant retention portion. Alternatively, the surface coating may be provided on a part of the portion other than the narrow portion in the lubricant retention portion. Examples of the material of the surface coating include fluororesins such as polytetrafluoroethylene, perfluoroalkoxy alkane, perfluoroethylene propene copolymer, polychlorotrifluoroethylene, polyvinylidene fluoride, and polyvinyl fluoride. Of these, polytetrafluoroethylene, perfluoroalkoxy alkane, and perfluoroethylene propylene copolymer are preferable from the viewpoint of their low interfacial tension.

From the viewpoint of promoting the adhesion of the lubricant to the narrow portion, the surface coating preferably has a lower interfacial tension than the lubricant.

A method for producing a fixed valve body that includes the above-described lubricant retention portion(s) may be, for example, a production method including the following steps. According to this method, a fixed valve body configured such that a surface coating is not provided on narrow portions can be produced easily.

(1) a first step of forming a fixed valve body that includes a lubricant retention portion in which a narrow portion is not provided (2) a second step of forming a surface coating on a surface of the lubricant retention portion formed in the first step (3) a third step of forming a narrow portion by cutting a part of the lubricant retention portion having the surface coating formed in the second step There is no limitation on the lubricant, and examples thereof include wax and grease. The lubricant preferably has a small interfacial tension. From this viewpoint, silicone grease is preferable.

By increasing the depth of the lubricant retention portion, the amount of the lubricant that the lubricant retention portion can retain can be increased. Further, even when the lubricant is reduced to increase the height of the first sliding surface PL1 as measured from the upper surface of the lubricant, the narrow portion enables supply of the lubricant. From this viewpoint, the depth (maximum depth) of the lubricant retention portion is preferably greater than or equal to 1.0 mm, more preferably greater than or equal to 1.1 mm, and still more preferably greater than or equal to 1.2 mm. Considering the thickness and the strength of the fixed valve body, the depth (maximum depth) of the lubricant retention portion is preferably less than or equal to 1.6 mm, more preferably less than or equal to 1.5 mm, and still more preferably less than or equal to 1.4 mm. The depth is measured along a direction perpendicular to the first sliding surface PL1.

The configuration of the narrow portion is not limited as long as the width thereof is locally reduced. Examples of the configuration of the narrow portion include the following configurations.

[Configuration 1]: groove
[Configuration 2]: valley portion
[Configuration 3]: corner portion
[Configuration 4]: proximity portion where two surfaces are close to each other
[Configuration 5]: combinations of two or more configurations selected from the group consisting of the above configurations 1 to 4

Regarding the above configuration 1, the cross-sectional shape of the groove is not limited. The groove may have a bottom surface and side surfaces. The groove may be a groove without a bottom surface, such as a groove having a V-shaped, U-shaped, or arc-shaped cross section. The lubricant retention portion may have a side surface perpendicular to the first sliding surface PL1, and the groove may be formed on this perpendicular side surface. The lubricant retention portion may have a surface inclined with respect to the first sliding surface PL1, and the groove may be formed on this inclined surface.

Regarding the above configuration 2, the valley portion may be formed in such a manner that the position of the lowest point of the valley portion becomes gradually higher toward the first sliding surface PL1.

Regarding the above configuration 3, the corner portion may be formed by a first side surface and a second side surface that are formed in the lubricant retention portion and intersect each other. The lubricant retention portion may have an inclined bottom surface and a side surface, and the corner portion may be formed by the inclined bottom surface and the side surface that intersect each other. The corner portion may extend in a direction perpendicular to the first sliding surface PL1, or may extend in a direction inclined with respect to the first sliding surface PL1. The corner portion is one type of valley portion.

Regarding the above configuration 4, for example, in a lubricant retention portion having a first side surface and a second side surface, a narrow portion can be provided when the first side surface and the second side surface are closely located to each other even when they do not intersect each other. In this case, the first side surface and the second side surface may intersect with a third surface, and a groove-shaped portion having the third surface as the bottom surface may be formed.

Examples of the material of the fixed valve body include resins (including fiber reinforced resins), metals, and ceramic materials. From the viewpoint of abrasion resistance to sliding with the movable valve body (the lower member), ceramic materials are preferable. The ceramic materials are preferable also from the viewpoint of high corrosion resistance to water, high strength, and high durability. Preferable ceramic materials are, for example, aluminum oxide (alumina) and silicon carbide (SiC). In the above-described embodiments, a ceramic material (alumina) is used.

Examples of the material of the lower member of the movable valve body include resins (including fiber reinforced resins), metals, and ceramic materials. From the viewpoint of abrasion resistance to sliding with the fixed valve body, ceramic materials are preferable. The ceramic materials are preferable also from the viewpoint of corrosion resistance to water, strength, and durability. In the above-described embodiments, a ceramic material (alumina) is used.

It is desirable to make the surface of a portion utilizing the capillary action rougher. When the portion has a rough surface, the surface area thereof increases, whereby the apparent interfacial tension increases. Accordingly, by making the surface of the portion rough, supply of the lubricant utilizing the capillary action can be promoted. From this viewpoint, the arithmetic mean roughness Ra of the narrow portion is preferably greater than or equal to 0.5 µm, more preferably greater than or equal to 0.7 µm, and still more preferably greater than or equal to 0.9 µm. Considering the difficulty in processing, the arithmetic mean roughness Ra of the narrow portion is preferably less than or equal to 1.5 µm, more preferably less than or equal to 1.3 µm, and still more preferably less than or equal to 1.1 µm. From the viewpoint of the capillary action, the narrow portion preferably has a larger arithmetic mean roughness Ra than the first sliding surface PL1. In the lubricant retention portion, the arithmetic mean roughness Ra of the narrow portion may be set larger than the arithmetic mean roughness Ra of at least a portion other than the narrow portion. The arithmetic mean roughness Ra is defined in JIS B 0601-2001.

Regarding the above-described embodiments, the following clauses are disclosed.

[Clause 1] A mixer faucet including:
 a fixed valve body; and
 a movable valve body,
 wherein the fixed valve body includes a hot water supply hole, a cold water supply hole, a drain hole, a first sliding surface on which the movable valve body slides, and a lubricant retention portion adjacent to the first sliding surface,
 the movable valve body includes a second sliding surface that is configured to slide on the first sliding surface and a hot-and-cold water mixer recess,
 at least a part of the lubricant retention portion is provided in the following (a) and (b):
  (a) a circumferentially extended region of the hot water supply hole; and
  (b) a circumferentially extended region of the cold water supply hole,
 in the circumferentially extended region of the hot water supply hole, only the first sliding surface is present between the hot water supply hole and the lubricant retention portion, and
 in the circumferentially extended region of the cold water supply hole, only the first sliding surface is present between the cold water supply hole and the lubricant retention portion.

[Clause 2] The mixer faucet according to clause 1,
 wherein the lubricant retention portion includes a narrow portion whose width is locally reduced, and the narrow portion extends downward from the first sliding surface.

[Clause 3] The mixer faucet according to clause 2,
 wherein the narrow portion includes a hot water-side narrow portion provided in the circumferentially extended region of the hot water supply hole and a cold water-side narrow portion provided in the circumferentially extended region of the cold water supply hole.

[Clause 4] The mixer faucet according to clause 2 or 3,
 wherein the lubricant retention portion includes a surface coating that has a lower interfacial tension than a material of the fixed valve body, and
 the surface coating is provided on a portion other than the narrow portion.

[Clause 5] The mixer faucet according to any one of clauses 2 to 4,
 wherein a width W1 of the narrow portion at a depth of 0.03 mm is less than or equal to 0.7 mm.

[Clause 6] A mixer faucet including:
 a fixed valve body; and
 a movable valve body,
 wherein the fixed valve body includes a hot water supply hole, a cold water supply hole, a drain hole, a first sliding surface on which the movable valve body slides, and a lubricant retention portion adjacent to the first sliding surface,
 the movable valve body includes a second sliding surface that is configured to slide on the first sliding surface and a hot-and-cold water mixer recess,
 the lubricant retention portion includes a narrow portion whose width is locally reduced, and
 the narrow portion extends downward from the first sliding surface.

[Clause 7] The mixer faucet according to any one of clauses 1 to 6, wherein, when a shortest distance between the hot water supply hole and the lubricant retention portion is defined as D1 and a shortest distance between the cold water supply hole and the lubricant retention portion is defined as D2, D1/D2 is greater than or equal to 0.5 and less than or equal to 2.

[Clause 8] The mixer faucet according to clause 7,
wherein the shortest distance D1 is greater than or equal to 0.5 mm and less than or equal to 7 mm, and the shortest distance D2 is greater than or equal to 0.5 mm and less than or equal to 7 mm.

[Clause 9] The mixer faucet according to any one of clauses 1 to 8,
wherein, when an area of the first sliding surface is defined as M1 and an area of the lubricant retention portion is defined as M2, M2/M1 is greater than or equal to 0.05 and less than or equal to 0.40.

In the present disclosure, inventions other than those included in claims (including an independent claim) are also described. The forms, members, configurations, and combinations thereof described in the claims and the embodiments of the present disclosure should be recognized as inventions based on the functions and effects of each of them.

The forms, members, configurations, and the like shown in the above-described embodiments are each independently applicable to all inventions described in the present disclosure, including those set forth in the claims of the present disclosure, even if not every form, member, or configuration described in the embodiments is used.

LIST OF REFERENCE CHARACTERS

10 Mixer faucet
14 Lever handle
16 Discharge portion
18 Hot water inlet pipe
20 Cold water inlet pipe
22 Discharge pipe
38 Valve assembly
44 Rotatable body
46 Lever
48 Lever rotary shaft
60 Movable valve body
62, 162 Fixed valve body
80, 180 Hot water supply hole
82, 182 Cold water supply hole
84, 184 Drain hole
100, 200 Outer edge of fixed valve body
102, 202 Lubricant retention portion
110, 210 Narrow portion
R1 Circumferentially extended region of hot water supply hole
R2 Circumferentially extended region of cold water supply hole
PL1 First sliding surface
PL2 Second sliding surface
PL3 Sliding interface

The invention claimed is:
1. A mixer faucet comprising:
a fixed valve body; and
a movable valve body,
wherein the fixed valve body includes a hot water supply hole, a cold water supply hole, a drain hole, a first sliding surface on which the movable valve body slides, and a lubricant retention portion adjacent to the first sliding surface,
the movable valve body includes a second sliding surface that is configured to slide on the first sliding surface and a hot-and-cold water mixer recess,
at least a part of the lubricant retention portion is provided in:
a circumferentially extended region of the hot water supply hole; and
a circumferentially extended region of the cold water supply hole,
in the circumferentially extended region of the hot water supply hole, only the first sliding surface is present between the hot water supply hole and the lubricant retention portion,
in the circumferentially extended region of the cold water supply hole, only the first sliding surface is present between the cold water supply hole and the lubricant retention portion, and
in a water discharge state, the hot-and-cold water mixer recess does not overlap the lubricant retention portion.

2. The mixer faucet according to claim 1,
wherein the lubricant retention portion includes a narrow portion whose width is locally reduced, and
the narrow portion extends downward from the first sliding surface.

3. The mixer faucet according to claim 2,
wherein the narrow portion includes a hot water-side narrow portion provided in the circumferentially extended region of the hot water supply hole and a cold water-side narrow portion provided in the circumferentially extended region of the cold water supply hole.

4. The mixer faucet according to claim 3,
wherein, when a shortest distance between the hot water supply hole and the hot water-side narrow portion is defined as D3 and a shortest distance between the cold water supply hole and the cold water-side narrow portion is defined as D4, the shortest distance D3 is greater than or equal to 0.5 mm and less than or equal to 7 mm, and the shortest distance D4 is greater than or equal to 0.5 mm and less than or equal to 7 mm.

5. The mixer faucet according to claim 2, wherein the narrow portion includes:
a hot water-side narrow portion, an upper end of the hot water-side narrow portion being provided in the circumferentially extended region of the hot water supply hole; and
a cold water-side narrow portion, an upper end of the cold water-side narrow portion being provided in the circumferentially extended region of the cold water supply hole.

6. The mixer faucet according to claim 2,
wherein the narrow portion is a corner portion or a groove.

7. The mixer faucet according to claim 1,
wherein, when a shortest distance between the hot water supply hole and the lubricant retention portion is defined as D1 and a shortest distance between the cold water supply hole and the lubricant retention portion is defined as D2, D1/D2 is greater than or equal to 0.5 and less than or equal to 2.

8. The mixer faucet according to claim 7,
wherein the shortest distance D1 is greater than or equal to 0.5 mm and less than or equal to 7 mm, and the shortest distance D2 is greater than or equal to 0.5 mm and less than or equal to 7 mm.

9. The mixer faucet according to claim 1,
wherein, when an area of the first sliding surface is defined as M1 and an area of the lubricant retention portion is defined as M2, M2/M1 is greater than or equal to 0.05 and less than or equal to 0.40.

10. The mixer faucet according to claim 1,
wherein in an entire movable range of the movable valve body, the hot-and-cold water mixer recess does not overlap the lubricant retention portion.

11. The mixer faucet according to claim 1,
wherein the lubricant retention portion includes a first lubricant retention portion and a second lubricant retention portion, and
the first lubricant retention portion and the second lubricant retention portion are not connected to each other.

12. The mixer faucet according to claim 1,
wherein the lubricant retention portion includes a first lubricant retention portion and a second lubricant retention portion,
each of the first lubricant retention portion and the second lubricant retention portion includes a narrow portion whose width is locally reduced,
an upper end of the narrow portion of the first lubricant retention portion is located in the circumferentially extended region of the hot water supply hole, and
an upper end of the narrow portion of the second lubricant retention portion is located in the circumferentially extended region of the cold water supply hole.

13. The mixer faucet according to claim 1,
wherein the lubricant retention portion includes a first lubricant retention portion and a second lubricant retention portion, and
in a plan view of the fixed valve body, when an area of the first sliding surface is defined as M1, an area of the first lubricant retention portion is defined as M3, and an area of the second lubricant retention portion is defined as M4, then M3/M1 is greater than or equal to 0.01 and less than or equal to 0.20, and M4/M1 is greater than or equal to 0.01 and less than or equal to 0.20.

14. The mixer faucet according to claim 1,
wherein a lubricant is contained in the lubricant retention portion, and
the lubricant retention portion includes a capillary action promoting portion in which capillary action is caused more easily than in other portions of the lubricant retention portion, the capillary action causing the lubricant to be drawn up toward the first sliding surface.

15. The mixer faucet according to claim 14,
wherein the lubricant retention portion includes a narrow portion whose width is locally reduced,
the narrow portion extends downward from the first sliding surface, and
the narrow portion is the capillary action promoting portion.

16. The mixer faucet according to claim 1,
wherein, in a plan view of the fixed valve body,
among circles that include an entirety of the fixed valve body inside them, one circle having a smallest radius is defined as a smallest enclosing circle,
a center of the smallest enclosing circle is defined as a center CP,
a point that is present on an upper opening line of the hot water supply hole and located closest to the cold water supply hole in a circumferential direction is defined as a point P1,
a point that is present on an upper opening line of the cold water supply hole and located closest to the hot water supply hole in the circumferential direction is defined as a point P2,
a straight line that passes through the point P1 and the center CP is defined as a straight line L1,
a straight line that passes through the point P2 and the center CP is defined as a straight line L2,
a straight line that passes through the center CP and bisects an angle formed by the straight line L1 and the straight line L2 into two equal parts is defined as a straight line L3,
a circle that is concentric with the smallest enclosing circle and passes through a radially outermost point present on the upper opening line of the hot water supply hole is defined as a circle C1,
a circle that is concentric with the smallest enclosing circle and passes through a radially innermost point present on the upper opening line of the hot water supply hole is defined as a circle C2,
a circle that is concentric with the smallest enclosing circle and passes through a radially outermost point present on the upper opening line of the cold water supply hole is defined as a circle C3,
a circle that is concentric with the smallest enclosing circle and passes through a radially innermost point present on the upper opening line of the cold water supply hole is defined as a circle C4,
the circumferentially extended region of the hot water supply hole is a region that extends between the circle C1 and the circle C2, extends in the circumferential direction on a side opposite to the cold water supply hole, and terminates at the straight line L3, and
the circumferentially extended region of the cold water supply hole is a region that extends between the circle C3 and the circle C4, extends in the circumferential direction on a side opposite to the hot water supply hole, and terminates at the straight line L3.

17. A mixer faucet comprising:
a fixed valve body; and
a movable valve body,
wherein the fixed valve body includes a hot water supply hole, a cold water supply hole, a drain hole, a first sliding surface on which the movable valve body slides, and a lubricant retention portion adjacent to the first sliding surface,
the movable valve body includes a second sliding surface that is configured to slide on the first sliding surface and a hot-and-cold water mixer recess,
at least a part of the lubricant retention portion is provided in:
a circumferentially extended region of the hot water supply hole; and
a circumferentially extended region of the cold water supply hole,
in the circumferentially extended region of the hot water supply hole, only the first sliding surface is present between the hot water supply hole and the lubricant retention portion,
in the circumferentially extended region of the cold water supply hole, only the first sliding surface is present between the cold water supply hole and the lubricant retention portion,
the lubricant retention portion includes a narrow portion whose width is locally reduced,
the narrow portion extends downward from the first sliding surface,
the lubricant retention portion includes a surface coating that has a lower interfacial tension than a material of the fixed valve body, and the surface coating is provided on a portion other than the narrow portion.

18. A mixer faucet comprising:
a fixed valve body; and
a movable valve body,
wherein the fixed valve body includes a hot water supply hole, a cold water supply hole, a drain hole, a first sliding surface on which the movable valve body slides, and a lubricant retention portion adjacent to the first sliding surface,
the movable valve body includes a second sliding surface that is configured to slide on the first sliding surface and a hot-and-cold water mixer recess,
at least a part of the lubricant retention portion is provided in:
 a circumferentially extended region of the hot water supply hole; and
 a circumferentially extended region of the cold water supply hole,
in the circumferentially extended region of the hot water supply hole, only the first sliding surface is present between the hot water supply hole and the lubricant retention portion,
in the circumferentially extended region of the cold water supply hole, only the first sliding surface is present between the cold water supply hole and the lubricant retention portion,
the lubricant retention portion includes a narrow portion whose width is locally reduced,
the narrow portion extends downward from the first sliding surface, and
a width W1 of the narrow portion at a depth of 0.03 mm is less than or equal to 0.7 mm.

19. A mixer faucet comprising:
a fixed valve body; and
a movable valve body,
wherein the fixed valve body includes a hot water supply hole, a cold water supply hole, a drain hole, a first sliding surface on which the movable valve body slides, and a lubricant retention portion adjacent to the first sliding surface,
the movable valve body includes a second sliding surface that is configured to slide on the first sliding surface and a hot-and-cold water mixer recess,
at least a part of the lubricant retention portion is provided in:
 a circumferentially extended region of the hot water supply hole; and
 a circumferentially extended region of the cold water supply hole,
in the circumferentially extended region of the hot water supply hole, only the first sliding surface is present between the hot water supply hole and the lubricant retention portion,
in the circumferentially extended region of the cold water supply hole, only the first sliding surface is present between the cold water supply hole and the lubricant retention portion,
a lubricant is contained in the lubricant retention portion, and
the lubricant retention portion includes a capillary action promoting portion in which capillary action is caused more easily than in other portions of the lubricant retention portion, the capillary action causing the lubricant to be drawn up toward the first sliding surface.

20. A mixer faucet comprising:
a fixed valve body; and
a movable valve body,
wherein the fixed valve body includes a hot water supply hole, a cold water supply hole, a drain hole, a first sliding surface on which the movable valve body slides, and a lubricant retention portion adjacent to the first sliding surface,
the movable valve body includes a second sliding surface that is configured to slide on the first sliding surface and a hot-and-cold water mixer recess,
at least a part of the lubricant retention portion is provided in:
 a circumferentially extended region of the hot water supply hole; and
 a circumferentially extended region of the cold water supply hole,
in the circumferentially extended region of the hot water supply hole, only the first sliding surface is present between the hot water supply hole and the lubricant retention portion,
in the circumferentially extended region of the cold water supply hole, only the first sliding surface is present between the cold water supply hole and the lubricant retention portion,
the lubricant retention portion includes a narrow portion whose width is locally reduced,
the narrow portion extends downward from the first sliding surface, and
the narrow portion is a corner portion or a groove.

* * * * *